US012654969B2

(12) United States Patent
Koyanagi et al.

(10) Patent No.: US 12,654,969 B2
(45) Date of Patent: Jun. 16, 2026

(54) MEDIUM TRANSPORT DEVICE AND IMAGE READING DEVICE

(71) Applicant: SEIKO EPSON CORPORATION, Tokyo (JP)

(72) Inventors: Noriyuki Koyanagi, Kitakyushu (JP); Shuichi Kadota, Fukuoka (JP); Yoichiro Nishimura, Kitakyushu (JP); Ryoichi Shuto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 18/799,712

(22) Filed: Aug. 9, 2024

(65) Prior Publication Data

US 2025/0051118 A1     Feb. 13, 2025

(30) Foreign Application Priority Data

Aug. 9, 2023     (JP) ................................. 2023-130383

(51) Int. Cl.
| | |
|---|---|
| *B65H 7/12* | (2006.01) |
| *B65H 5/06* | (2006.01) |
| *H04N 1/00* | (2006.01) |
| *H04N 1/12* | (2006.01) |

(52) U.S. Cl.
CPC ............. *B65H 7/125* (2013.01); *B65H 5/062* (2013.01); *H04N 1/00525* (2013.01); *H04N 1/124* (2013.01); *B65H 2404/14* (2013.01); *B65H 2511/524* (2013.01); *B65H 2553/30* (2013.01); *B65H 2601/523* (2013.01); *B65H 2801/39* (2013.01)

(58) Field of Classification Search
CPC ................ B65H 7/125; B65H 2553/30; B65H 2511/524; G03G 2215/00637
See application file for complete search history.

(56) References Cited

U.S. PATENT DOCUMENTS

| | | | |
|---|---|---|---|
| 11,353,607 B2 * | 6/2022 | Arai ........................ | B65H 7/125 |
| 2005/0041987 A1 * | 2/2005 | Lee .................... | H04N 1/00588 |
| | | | 399/16 |
| 2020/0039774 A1 | 2/2020 | Yamada et al. | |

FOREIGN PATENT DOCUMENTS

JP          2020025242 A          2/2020

* cited by examiner

*Primary Examiner* — Jeremy R Severson
(74) *Attorney, Agent, or Firm* — WORKMAN NYDEGGER

(57)          ABSTRACT

A medium transport device includes a first roller pair, a second roller pair disposed downstream of the first roller pair, and an ultrasonic detection section disposed between the first roller pair and the second roller pair.

The ultrasonic detection section includes a transmission sensor chip, a receiving sensor chip, a transmission board on which the transmission sensor chip is provided, and a receiving board on which the receiving sensor chip is provided. A first axis is inclined with respect to a surface of the medium passing between the transmission sensor chip and the receiving sensor chip and at least a part of the transmission sensor chip and at least a part of the receiving sensor chip are within a range of the second roller pair in a normal direction with respect to a surface of the medium at a nip position of the second roller pair.

20 Claims, 29 Drawing Sheets

MEDIUM TRANSPORT DEVICE AND IMAGE READING DEVICE

The present application is based on, and claims priority from JP Application Serial Number 2023-130383, filed Aug. 9, 2023, the disclosure of which is hereby incorporated by reference herein in its entirety.

BACKGROUND

1. Technical Field

The present disclosure relates to a medium transport device for transporting a medium, and an image reading device including the same.

2. Related Art

As shown in JP-A-2020-25242, a technique for detecting multi-feed of medium using an ultrasonic sensor has been used.

The adoption of the ultrasonic sensor tends to increase the size of the device.

In the prior art, there is room for improvement from the viewpoint of downsizing the device by devising a configuration and arrangement of the ultrasonic sensor.

SUMMARY

To solve the above problem, a medium transport device according to the present disclosure includes a first roller pair configured to transport a medium in a transport direction; a second roller pair disposed downstream of the first roller pair in the transport direction; and an ultrasonic detection section disposed between the first roller pair and the second roller pair in the transport direction, wherein the ultrasonic detection section includes a transmission sensor chip configured to emit ultrasonic waves along a first axis toward a first surface of the medium being transported, a receiving sensor chip that is configured to receive the ultrasonic waves and that is disposed at a position sandwiching the medium with the transmission sensor chip, the position being on the first axis, a transmission board that is a transmission board on which the transmission sensor chip is provided and on which the transmission sensor chip is mounted on a board surface, and a receiving board that is a receiving board on which the receiving sensor chip is provided and on which the receiving sensor chip is mounted on a board surface, the first axis is inclined with respect to a surface of the medium passing between the transmission sensor chip and the receiving sensor chip, the thickness of the transmission sensor chip is smaller than the thickness of the transmission board, the thickness of the receiving sensor chip is smaller than a thickness of the receiving board, and at least a part of the transmission sensor chip and at least a part of the receiving sensor chip are within a range of the second roller pair in a normal direction with respect to the surface of the medium at a nip position of the second roller pair.

An image reading device of the present disclosure includes the medium transport device and a reading section that is positioned downstream of the second roller pair in the transport direction and that is configured to read an image on the medium.

DESCRIPTION OF EMBODIMENTS

Figure 1:
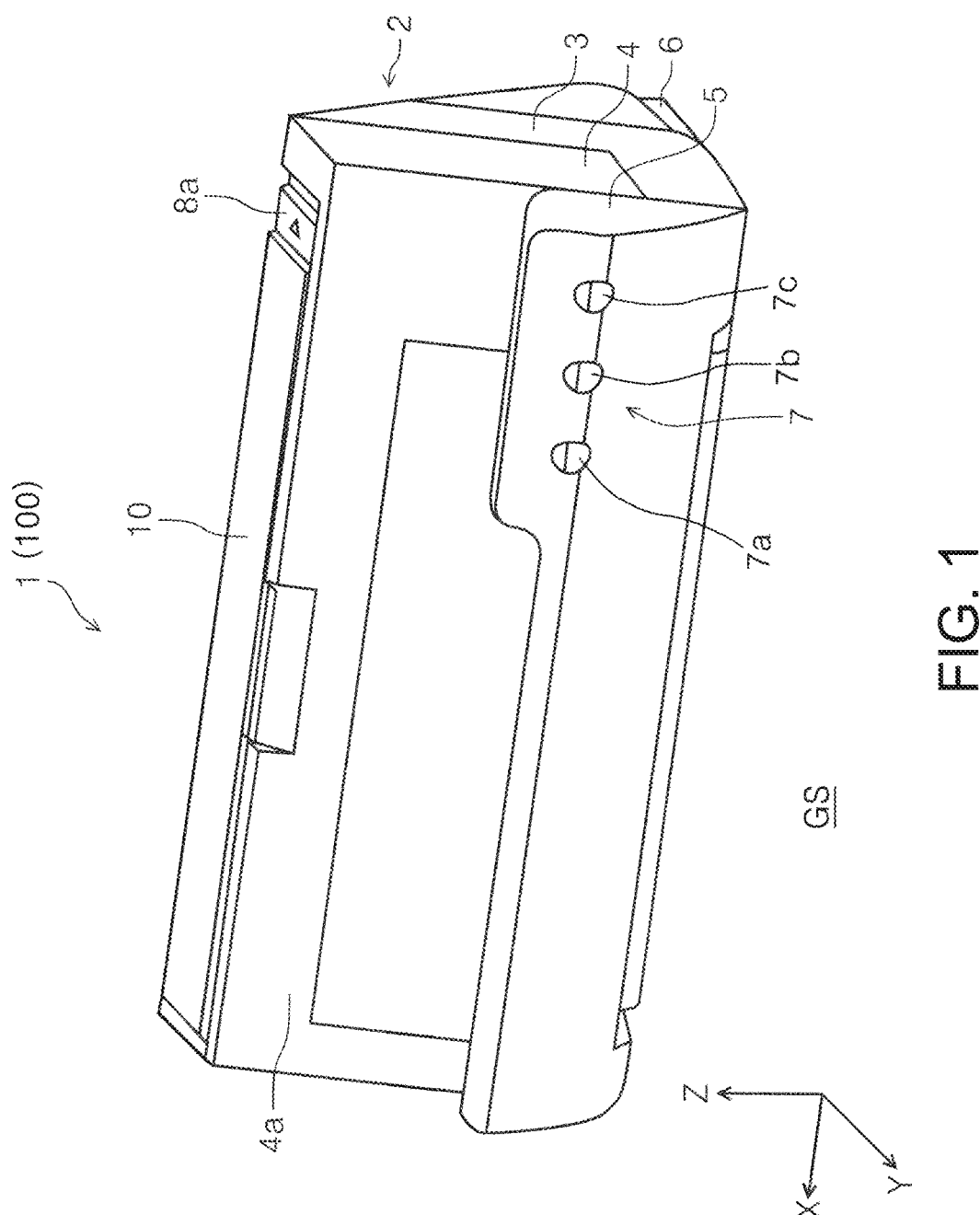
FIG. 1 is a perspective view of a scanner from the front.

Hereinafter, the present disclosure will be generally described.

A medium transport device according to the first aspect includes a first roller pair configured to transport a medium in a transport direction; a second roller pair disposed downstream of the first roller pair in the transport direction; and an ultrasonic detection section disposed between the first roller pair and the second roller pair in the transport direction, wherein the ultrasonic detection section includes a transmission sensor chip configured to emit ultrasonic waves along a first axis toward a first surface of the medium being transported, a receiving sensor chip that is configured to receive the ultrasonic waves and that is disposed at a position sandwiching the medium with the transmission sensor chip, the position being on the first axis, a transmission board that is a transmission board on which the transmission sensor chip is provided and on which the transmission sensor chip is mounted on a board surface, and a receiving board that is a receiving board on which the receiving sensor chip is provided and on which the receiving sensor chip is mounted on a board surface, the first axis is inclined with respect to a surface of the medium passing between the transmission sensor chip and the receiving sensor chip, the thickness of the transmission sensor chip is smaller than the thickness of the transmission board, the thickness of the receiving sensor chip is smaller than a thickness of the receiving board, and at least a part of the transmission sensor chip and at least a part of the receiving sensor chip are within a range of the second roller pair in a normal direction with respect to the surface of the medium at a nip position of the second roller pair.

According to the present aspect, since at least a part of the transmission sensor chip and at least a part of the receiving sensor chip are within a range of the second roller pair in a normal direction with respect to the surface of the medium at a nip position of the second roller pair, it is possible to suppress the size of the device in the normal direction with respect to the surface of the medium at the nip position of the second roller pair.

A second aspect is an aspect according to the first aspect, wherein at least a part of the transmission sensor chip and at least a part of the receiving sensor chip are within a range of the first roller pair in a normal direction with respect to the surface of the medium at a nip position of the first roller pair.

According to the present aspect, since at least a part of the transmission sensor chip and at least a part of the receiving sensor chip are within a range of the first roller pair in the normal direction with respect to the surface of the medium at a nip position of the first roller pair, it is possible to suppress the size of the device in the normal direction with respect to the surface of the medium at the nip position of the first roller pair.

A third aspect is an aspect according to the first aspect, further includes a third roller pair disposed downstream of the second roller pair in the transport direction, wherein at least a part of the transmission sensor chip and at least a part of the receiving sensor chip are within a range of the third roller pair a normal direction with respect to the surface of the medium at a nip position of the third roller pair.

According to the present aspect, since at least a part of the transmission sensor chip and at least a part of the receiving sensor chip are within a range of the third roller pair in the normal direction with respect to the surface of the medium at a nip position of the third roller pair, it is possible to suppress the size of the device in the normal direction with respect to the surface of the medium at the nip position of the third roller pair.

Note that the present aspect is not limited to the first aspect and may be dependent on the second aspect.

A fourth aspect is an aspect according to the first aspect, wherein an inter-axial distance of two rollers constituting the second roller pair is shorter than a distance between the transmission sensor chip and the receiving sensor chip on the first axis.

According to the present aspect, since an inter-axial distance of two rollers constituting the second roller pair is shorter than a distance between the transmission sensor chip and the receiving sensor chip on the first axis, it is possible to suppress the area occupied by the second roller pair in the direction along the inter-axial distance, and thus it is possible to suppress the size of the device.

Note that the present aspect is not limited to the first aspect and may be dependent on the second or third aspect.

A fifth aspect is an aspect according to the first aspect, further includes a third roller pair disposed downstream of the second roller pair in the transport direction, wherein an inter-axial distance of two rollers constituting the third roller pair is shorter than a distance between the transmission sensor chip and the receiving sensor chip on the first axis.

According to the present aspect, since an inter-axial distance of two rollers constituting the third roller pair is shorter than a distance between the transmission sensor chip and the receiving sensor chip on the first axis, it is possible to suppress the area occupied by the third roller pair in the direction along the inter-axial distance, and thus it is possible to suppress the size of the device.

Note that the present aspect is not limited to the first aspect and may be dependent on any of the second to fourth aspects.

A sixth aspect is an aspect according to the first aspect, wherein an inter-axial distance of two rollers constituting the first roller pair is shorter than a distance between the transmission sensor chip and the receiving sensor chip on the first axis.

According to the aspect, since an inter-axial distance of two rollers constituting the first roller pair is shorter than a distance between the transmission sensor chip and the receiving sensor chip on the first axis, it is possible to suppress the area occupied by the first roller pair in the direction along the inter-axial distance, and thus it is possible to suppress the size of the device.

Note that the present aspect is not limited to the first aspect and may be dependent on any of the second to fifth aspects.

A seventh aspect is an aspect according to the first aspect, wherein the transmission board and the receiving board are inclined with respect to a normal direction with respect to the surface of the medium passing between the transmission sensor chip and the receiving sensor chip, a transmission surface of the transmission sensor chip is along a surface of the transmission board, a receiving surface of the receiving sensor chip is along a surface of the receiving board, and at least a part of the transmission board and at least a part of the receiving board are within the range of the second roller pair in the normal direction with respect to the surface of the medium at the nip position of the second roller pair.

According to the present aspect, since at least a part of the transmission board and at least a part of the receiving board are within the range of the second roller pair in the normal direction with respect to the surface of the medium at the nip position of the second roller pair, it is possible to suppress the size of the device in the normal direction with respect to the surface of the medium at the nip position of the second roller pair.

Note that the present aspect is not limited to the first aspect and may be dependent on any of the second to sixth aspects.

An eighth aspect is an aspect according to the first aspect, further includes a third roller pair disposed downstream of the second roller pair in the transport direction, wherein a path length between the first roller pair and the second roller pair is shorter than a path length between the second roller pair and the third roller pair.

According to the present aspect, since a path length between the first roller pair and the second roller pair is shorter than a path length between the second roller pair and the third roller pair, it is possible to suppress the path length between the first roller pair and the second roller pair, and thus suppress the size of the device. Note that the present aspect is not limited to the first aspect and may be dependent on any of the second to sixth aspects.

A ninth aspect is an aspect according to the first aspect, further includes a transmission board holder configured to hold the transmission board, a receiving board holder configured to hold the receiving board, a transmission-side path forming member that is configured to form a medium transport path between the first roller pair and the second roller pair and that fixes the transmission board holder, and a receiving-side path forming member that is configured to form the medium transport path between the first roller pair and the second roller pair and that fixes the receiving board holder.

According to the present aspect, since the transmission board and the receiving board are fixed to the members forming the medium transport path, the distance between the medium and the transmission sensor chip and the distance between the medium and the receiving sensor chip are stabilized, and thus the detection value of the ultrasonic waves is stabilized.

Note that the present aspect is not limited to the first aspect and may be dependent on any of the second to sixth aspects.

A tenth aspect is an aspect according to the ninth aspect, wherein the transmission board holder includes a first protection member that is provided on the first axis and that is positioned between the transmission sensor chip and the medium and the receiving board holder includes a second protection member that is provided on the first axis and that is positioned between the receiving sensor chip and the medium.

According to the present aspect, since the transmission board and the first protection member are provided on the transmission board holder, it is possible to suppress variation in the distance between the transmission sensor chip and the first protection member. As a result, it is possible to appropriately suppress multiple reflections of the ultrasonic waves between the transmission board and the first protection member.

Since the receiving board and the second protection member are provided in the receiving board holder, it is possible to suppress variation in the distance between the receiving sensor chip and the second protection member. As a result, it is possible to appropriately suppress multiple reflections of the ultrasonic waves between the receiving sensor chip and the second protection member.

The image reading device according to eleventh aspect includes the medium transport device according to any one of the first to tenth aspects and a reading section that is positioned downstream of the second roller pair in the transport direction and that is configured to read an image on the medium.

According to the present aspect, in the image reading device, any of the effects of the first to tenth aspects described above can be obtained.

A twelfth aspect is an aspect according to the eleventh aspect, wherein the transmission board and the receiving board have a long side and a short side, and are disposed such that the short side is along the transport direction, the reading section includes a glass plate configured to contact the medium and guide the medium downstream, and the length of the short side of the transmission board and the length of the short side of the receiving board are both shorter than the length of the glass plate in the transport direction.

According to the aspect, since the transmission board and the receiving board have a long side and a short side, and are disposed such that the short side is along the transport direction, it is possible to bring the first roller pair and the second roller pair close to each other in the transport direction, and it is possible to contribute to downsizing of the device.

Since the length of the short side of the transmission board and the length of the short side of the receiving board are both shorter than the length of the glass plate in the transport direction, it is possible to suppress the length of the short side in the transport direction. As a result, the first roller pair and the second roller pair can be brought closer to each other in the transport direction, and it is possible to contribute to further downsizing of the device.

A thirteenth aspect is an aspect according to the eleventh aspect, further includes the reading section is a first reading section configured to read the first surface of the medium, and the image reading device further includes a second reading section configured to read a second surface opposite to the first surface, the first reading section includes a reading sensor, and the transmission sensor chip is positioned closer to the second reading section than the reading sensor in the normal direction with respect to the surface of the medium facing the first reading section.

According to the present aspect, since the transmission sensor chip is positioned closer to the second reading section than the reading sensor in the normal direction with respect to the surface of the medium facing the first reading section, it is possible to suppress the amount of protrusion of the transmission sensor chip from the first reading section in the normal direction and to suppress the size of the device in the normal direction.

Note that the present aspect is not limited to the first aspect and may be dependent on the second aspect.

A fourteenth aspect is an aspect according to the eleventh aspect, further includes the reading section is a first reading section configured to read the first surface of the medium, and the image reading device further includes a second reading section configured to read a second surface of the medium, at least a part of the receiving sensor chip is within a range of the second reading section in the normal direction with respect to the surface of the medium facing the second reading section.

According to the present aspect, since at least a part of the receiving sensor chip is within a range of the second reading section in the normal direction with respect to the surface of the medium facing the second reading section, it is possible to suppress the size of the device in the normal direction.

Note that the present aspect is not limited to the eleventh aspect and may be dependent on the twelfth or thirteenth aspect.

Hereinafter, the present disclosure will be described in detail.

Hereinafter, as an example of an image reading device, a scanner 1 capable of reading at least one of a first surface S1 and a second surface S2 opposite to the first surface S1 of a document P, which is an example of a medium, will be described as an example. The scanner 1 is a so-called sheet feed type scanner that performs reading while moving the document P with respect to a first reading section 32 and a second reading section 33 (to be described later).

In this specification, the document P includes not only a sheet-like document but also a card-like document and a booklet-like document.

Note that the scanner 1 can be regarded as a medium transport device 100 from the viewpoint of transporting the document P, which is an example of a medium. In this case, the scanner 1 includes the medium transport device 100, and a first reading section 32 and a second reading section 33 (to be described later).

Note that in the X-Y-Z coordinate system shown in each figure, an X-axis direction is a device width direction and also a document width direction. A Y-axis direction is a device depth direction, and a Z-axis direction is a direction along a vertical direction. In the present embodiment, a +Y direction is a direction from a device rear surface to a front surface, and a −Y direction is a direction from the device front surface to the rear surface. As viewed from the device front surface, the left direction is a +X direction, and the right direction is a −X direction.

Hereinafter, a direction in which the document P is transported may be referred to as "downstream", and a direction opposite thereto may be referred to as "upstream".
Outline of Scanner In FIG. 1, the scanner 1 includes a device main body 2 and a main body support section 6 that supports the device main body 2. The main body support section 6 is placed on a placement surface GS of the device. The placement surface GS is, as an example, a surface parallel to a plane of a horizontal.

The device main body 2 includes a first unit 3, a second unit 4, and a third unit 5.

The second unit 4 and the third unit 5 are provided rotatable with respect to the first unit 3 around a rotation axis (not shown) parallel to the X-axis direction. The second unit 4 and the third unit 5 can rotate integrally with respect to the first unit 3 around the rotation axis. Reference symbol 8a in FIG. 1 indicates an unlocking section, and by sliding the unlocking section 8a in the −X direction, the user can unlock the second unit 4 and the third unit 5 from the first unit 3. By rotating the second unit 4 and the third unit 5 with respect to the first unit 3, a part of a document transport path can be exposed (see FIG. 4). In particular, by opening the second unit 4 with respect to the first unit 3, an upstream feeding path R0, a downstream feeding path R1, and a reading transport path R2 (to be described later) can be exposed.

The third unit 5 can rotate around a rotation axis (not shown) parallel to the X-axis direction with respect to the first unit 3 and the second unit 4. By rotating the third unit 5 with respect to the second unit 4, a U-turn discharge path R3 (see FIG. 2) downstream from the reading transport path R2 (to be described later) can be exposed. That is, the U-turn discharge path R3 is formed between the third unit 5 and the second unit 4.

Note that the third unit 5 is held with respect to the second unit 4 by a snap-fit structure (not shown), when the user applies an external force to the third unit 5, the holding of the third unit 5 with respect to the second unit 4 is released, and the third unit 5 can be opened.

Figure 2:
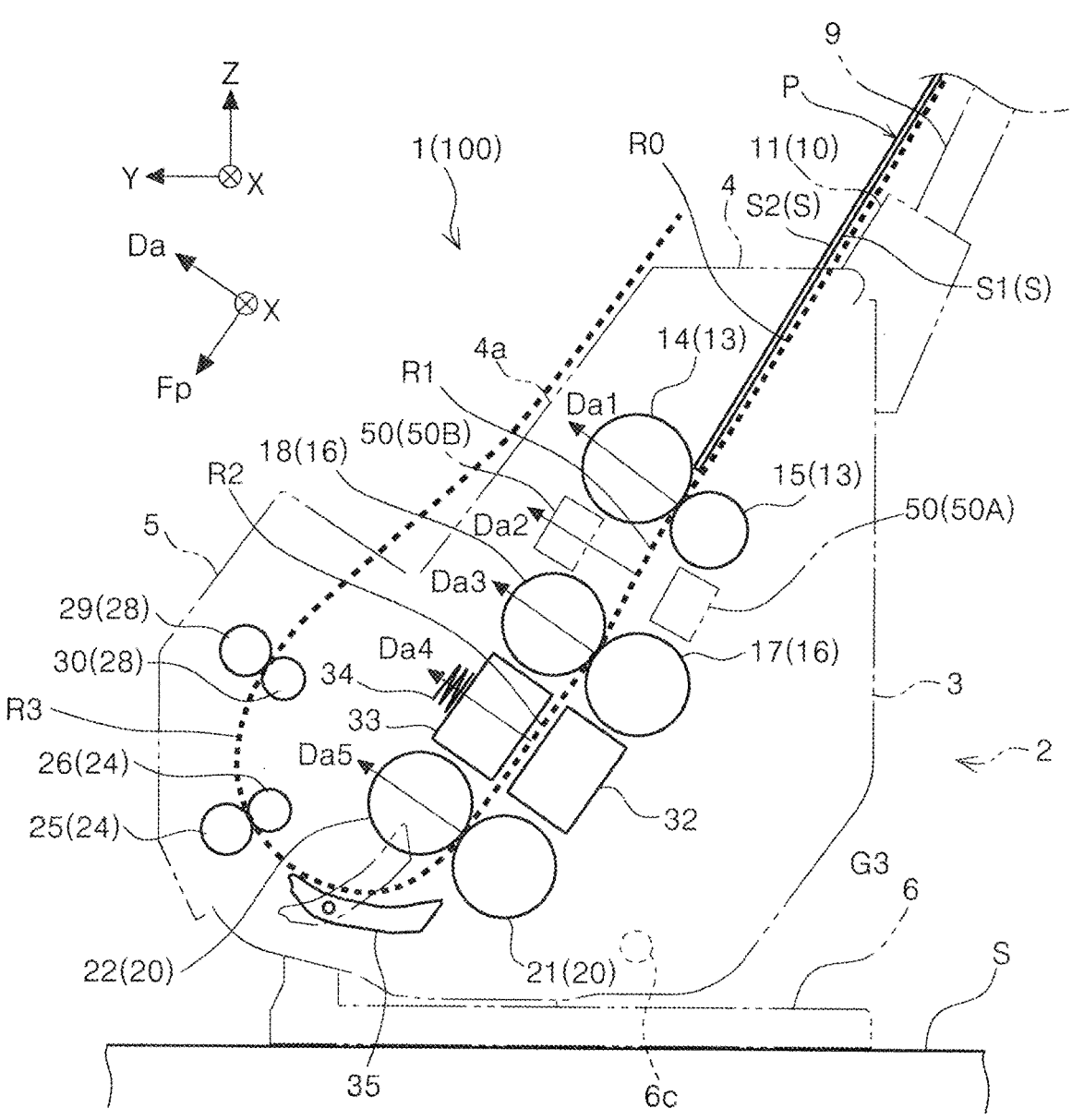
FIG. 2 is a view of the document transport path of the scanner as viewed from a width direction.

The device main body 2 is rotatable around a main body rotation shaft 6c (see FIG. 2) with respect to the main body support section 6, the device main body 2 in the present embodiment can be held in two postures by rotating. The posture of the device main body 2 shown in FIG. 2 is one of two postures, and is a normal reading posture. Note that the device main body 2 can assume a booklet reading posture (not shown) by rotating from this normal reading posture so that the reading transport path R2 approaches horizontal.

In FIG. 1, an operation section 7 including a plurality of operation buttons is provided on the device front surface. The plurality of operation buttons are constituted by operation buttons 7a, 7b, and 7c in the present embodiment, and these buttons receive user operations.
Document Transport Path of Scanner Next, a document transport path in the scanner 1 will be described with reference to FIG. 2. In FIG. 2, a thick dashed line indicates a transport path in which the document P is transported.

Reference symbol R0 denotes the transport path upstream of a first roller pair 13, and is hereinafter referred to as the upstream feeding path R0.

Reference symbol R1 denotes the transport path between the first roller pair 13 and a second roller pair 16, and is hereinafter referred to as the downstream feeding path R1.

Reference symbol R2 denotes the transport path between the second roller pair 16 and a third roller pair 20, and is hereinafter referred to as the reading transport path R2. Note that the reading transport path R2 is a transport path opposed to the first reading section 32 and the second reading section 33 (to be described later).

The first unit 3 configures a lower side of the upstream feeding path R0, the downstream feeding path R1, and the reading transport path R2 and the second unit 4 configures an upper side of the upstream feeding path R0, the downstream feeding path R1, and the reading transport path R2.

Reference symbol R3 denotes a transport path that reverses upward from the third roller pair 20 and is hereinafter referred to as a U-turn discharge path R3. The U-turn discharge path R3 is formed between the second unit 4 and the third unit 5.

The normal reading posture of the device main body 2 (FIG. 2) shows a posture in which the reading transport path R2 is connected to the U-turn discharge path R3 by a flap 35. Note that in the booklet reading posture (not shown) of the device main body 2, the flap 35 is in a posture indicated in two dot chain line, the reading transport path R2 is not connected to the U-turn discharge path R3, and the document P is discharged from the reading transport path R2 in an obliquely downward direction including a +Y direction component and a −Z direction component.

The normal reading posture is suitable for reading a sheet-like document P, that is, a document P having low rigidity and being easily bent. The booklet reading posture is suitable for reading the document P, which has high rigidity and is not easily bent, such as a plastic card or a booklet.

Hereinafter, the document transport path will be further described. The document P to be fed is supported in an inclined posture by the document support section 11 and the document support 9. When a plurality of documents P are supported by the document support section 11, the uppermost document P is fed downstream by a feed roller 14. The document support section 11 is formed in an upper opening/closing section 10. The upper opening/closing section 10 is rotatable around a rotation axis (not shown), and opens and closes a feed port by rotating.

The document support 9 can take a state of being housed in the upper opening/closing section 10 and a state of being developed from the upper opening/closing section 10. FIG. 1 shows a state in which the upper opening/closing section 10 is closed, and FIG. 2 shows a state in which the upper opening/closing section 10 is opened and the document support 9 is developed. The upper opening/closing section 10 and the document support 9 constitute the first unit 3.

Note that the scanner 1 adopts a so-called center feeding method, and the center position of the document P in the X-axis direction, that is, the width direction is the same regardless of the size of the document P.

The feed roller 14 and a separation roller 15 constitute the first roller pair 13.

The feed roller 14 is provided in the second unit 4. The feed roller 14 rotates by obtaining power from a transport motor 47 (see FIG. 3). The separation roller 15 is provided at a position opposed to the feed roller 14 in the first unit 3. Rotational torque is applied to the separation roller 15 by a torque limiter 15*b* (see FIG. 6) and the separation roller 15 suppresses multi-feed of the document P.

In the present embodiment, the feed roller 14 is provided on the upper side with respect to the document P placed on the document support section 11, and the document P is fed from the uppermost document P. However, the feed roller 14 may be provided on the lower side with respect to the document P placed on the document support section 11, and the document P may be fed from the lowermost document P.

An ultrasonic detection section 50 is provided in the downstream feeding path R1 downstream of the first roller pair 13. The ultrasonic detection section 50 includes a transmission unit 50A and a receiving unit 50B disposed opposite to each other across the downstream feeding path R1. A control section 80 (see FIG. 3) can detect multi-feed of the document P by a signal transmitted from the receiving unit 50B.

Note that in FIG. 2, the positions, sizes, and shapes of the transmission unit 50A and the receiving unit 50B are conceptually shown and details thereof will be described later with reference to FIG. 4 and subsequent drawings.

Note that in the present embodiment, the transmission unit 50A is disposed on the lower side of the downstream feeding path R1 and the receiving unit 50B is disposed on the upper side of the downstream feeding path R1, but the present invention is not limited thereto, and the receiving unit 50B may be disposed on the lower side of the downstream feeding path R1 and the transmission unit 50A may be disposed on the upper side of the downstream feeding path R1.

The second roller pair 16 is provided downstream of the feed roller 14 and the separation roller 15. The second roller pair 16 includes a second lower roller 17 provided in the first unit 3 and a second upper roller 18 provided in the second unit 4. The second upper roller 18 is provided so as to be movable forward and backward with respect to the second lower roller 17 and is pressed toward the second lower roller 17 by a pressing member (not shown), for example, a coil spring. By this, the second upper roller 18 moves forward and backward relative to the second lower roller 17 according to the thickness of the document P to be transported. Both the second lower roller 17 and the second upper roller 18 rotate by obtaining power from the transport motor 47 (see FIG. 3).

When the second unit 4 is closed with respect to the first unit 3, the second lower roller 17 and the second upper roller 18 come into contact with each other. When the second unit 4 is opened up from the first unit 3, the second upper roller 18 separates from the second lower roller 17.

Downstream of the second roller pair 16, the first reading section 32 and the second reading section 33 are opposed to each other. The first reading section 32 is provided in the first unit 3 and the second reading section 33 is provided in the second unit 4.

The first reading section 32 reads the lower surface, that is, the first surface S1 of the document P supported by the document support section 11, and the second reading section 33 reads the upper surface, that is, the second surface S2 of the document P supported by the document support section 11. The second reading section 33 is provided so as to be movable forward and backward with respect to the first reading section 32 and is pressed toward the first reading section 32 by a pressing spring 34, which is an example of a pressing member. By this, the second reading section 33 moves forward and backward with respect to the first reading section 32 according to the thickness of the document P being transported.

In the present embodiment, the first reading section 32 and the second reading section 33 are constituted by a contact image sensor module (CISM).

A third roller pair 20 is provided downstream of the first reading section 32 and the second reading section 33. The third roller pair 20 includes a third lower roller 21 provided in the first unit 3 and a third upper roller 22 provided in the second unit 4. The third upper roller 22 is provided so as to be movable forward and backward with respect to the third lower roller 21 and is pressed toward the third lower roller 21 by a pressing member (not shown), for example, a coil spring.

Both the third lower roller 21 and the third upper roller 22 rotate by obtaining power from the transport motor 47 (see FIG.

When the second unit 4 is closed with respect to the first unit 3, the third lower roller 21 and the third upper roller 22 come into contact with each other. When the second unit 4 is opened from the first unit 3, the third upper roller 22 separates from the third lower roller 21.

The flap 35 is provided downstream of the third roller pair 20. By rotating the flap 35, the above described document transport path is switched.

Note that in the present embodiment, the flap 35 is configured to rotate in conjunction with the posture switching of the device main body 2. As a configuration for rotating the flap 35 in conjunction with the posture switching of the device main body 2, an interlocking mechanism (not shown) in the present embodiment, for example, a configuration that mechanically rotates in conjunction with the posture of the device main body 2 by a cam mechanism. However, the flap 35 may be configured to rotate by a solenoid (not shown). In this case, a control section 80 (see FIG. 3), which performs various controls, drives the solenoid to rotate the flap 35 based on detection information of a posture detection sensor (not shown).

The U-turn discharge path R3 is provided with a fourth roller pair 24 and a fifth roller pair 28.

The fourth roller pair 24 includes a fourth drive roller 25 provided in the third unit 5 and a fourth driven roller 26 provided in the second unit 4. The fourth driven roller 26 is provided so as to be movable forward and backward with respect to the fourth drive roller 25 and is pressed toward the fourth drive roller 25 by a pressing member (not shown), for example, a coil spring. By this, the fourth driven roller 26 moves forward and backward with respect to the fourth drive roller 25 according to the thickness of the document P to be transported. The fourth drive roller 25 is driven by the transport motor 47 (see FIG. 3). The fourth driven roller 26 is a roller that is driven to rotate.

The fifth roller pair 28 includes a fifth drive roller 29 provided in the third unit 5 and a fifth driven roller 30 provided in the second unit 4. The fifth driven roller 30 is provided so as to be movable forward and backward with respect to the fifth drive roller 29 and is pressed toward the fifth drive roller 29 by a pressing member (not shown), for example, a coil spring. By this, the fifth driven roller 30 moves forward and backward with respect to the fifth drive roller 29 in according to the thickness of the document P to be transported. The fifth drive roller 29 is driven by the transport motor 47 (see FIG. 3). The fifth driven roller 30 is a roller that is driven to rotate.

When the third unit 5 is closed with respect to the second unit 4, the fourth drive roller 25 and the fourth driven roller 26 come into contact with each other, and the fifth drive roller 29 and the fifth driven roller 30 also come into contact with each other. When the third unit 5 is opened with respect to the second unit 4, the fourth drive roller 25 and the fourth driven roller 26 are separated from each other, and the fifth drive roller 29 and the fifth driven roller 30 are also separated from each other.

The document P discharged from the U-turn discharge path R3 is discharged obliquely upward including a −Y direction component by the fifth roller pair 28, and is supported in an inclined posture by an upper surface 4a of the second unit 4.

Note that a direction indicated by an arrow Da1 in FIG. 2 indicates a normal direction with respect to the first surface S1 and the second surface S2 opposite thereto of the document P at the document nip position in the first roller pair 13. Note that, since the first surface S1 and the opposite second surface S2 of the document P are parallel in most cases, they will be collectively referred to as a document surface S in the following description when they are not distinguished from each other.

An arrow Da2 indicates a normal direction with respect to the document surface S of the document P passing between the transmission unit 50A and the receiving unit 50B of the ultrasonic detection section 50.

An arrow Da3 indicates a normal direction with respect to the document surface S at the document nip position in the second roller pair 16.

An arrow Da4 indicates a normal direction with respect to the document surface S of the document P passing between the first reading section 32 and the second reading section 33.

An arrow Da5 indicates a normal direction with respect to the document surface S at the document nip position in the third roller pair 20.

In the present embodiment, the differences in these normal directions Da1, Da2, Da3, Da4, and Da5 are slight differences, and as an example, since the difference between the maximum angle and the minimum angle is within 5°, hereinafter, in a case where the normal directions are not distinguished from each other, the normal directions are referred to as normal direction Da.

A direction indicated by an arrow Fp in FIG. 2 is a direction orthogonal to the normal direction Da and indicates a direction in which the document P is transported. Hereinafter, this direction will be referred to as a transport direction Fp.

Figure 4:
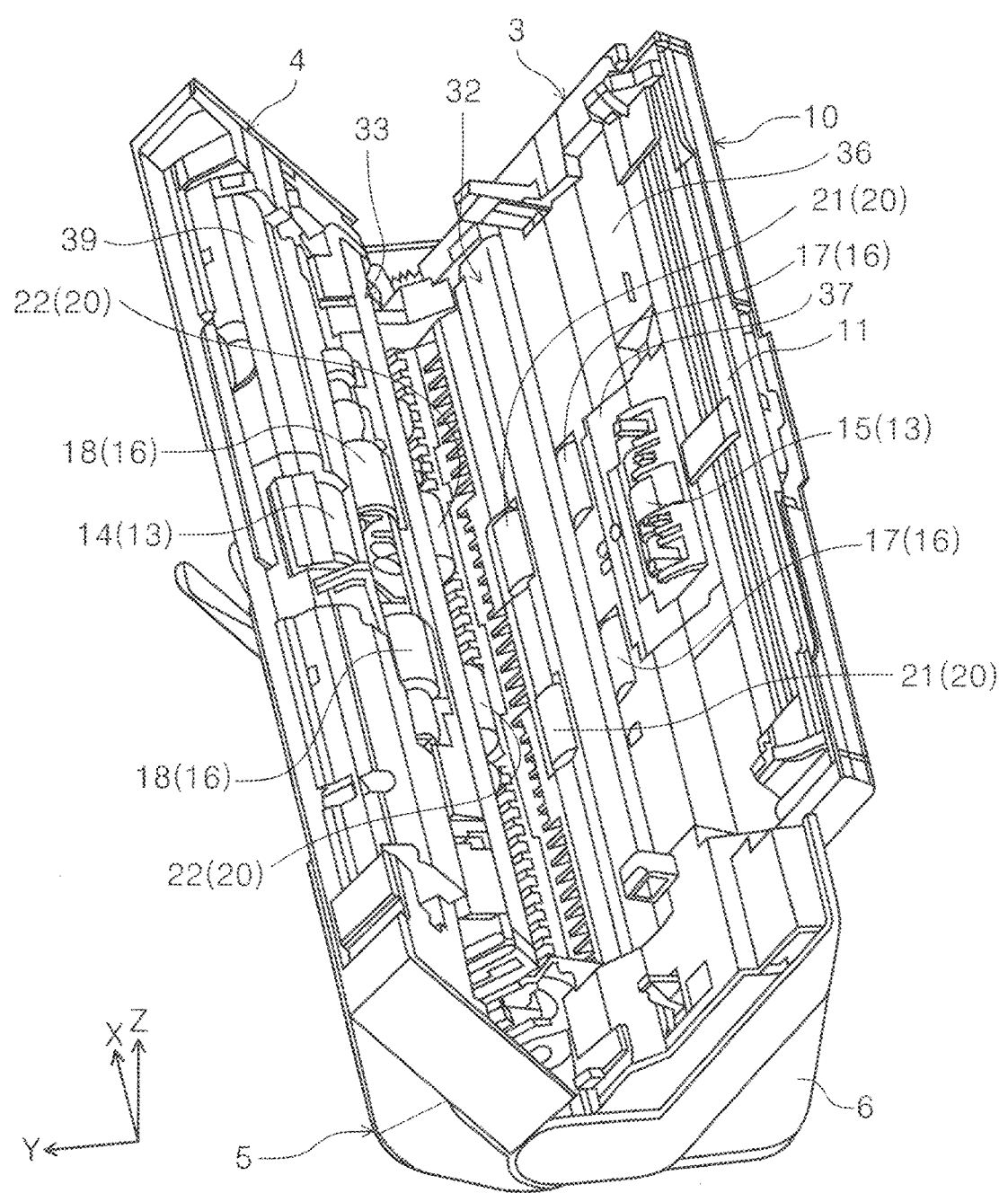
FIG. 4 is a perspective view of a state in which a second unit is opened with respect to a first unit.

Note that in FIG. 4 and subsequent figures, the X-Fp-Da coordinate system is used in some cases.

Control System of Scanner

Next, the control system of the scanner 1 will be described with reference to FIG. 3.

The control section 80 includes a calculation section 81 constituted by a central processing unit (CPU) or the like, and a storage section 85 constituted by a nonvolatile memory or a volatile memory.

The first reading section 32, the second reading section 33, the transport motor 47, and the ultrasonic detection section 50 are connected to the control section 80, and the control section 80 controls these units. Note that the transport motor 47 is a drive source for the feed roller 14, the second lower roller 17, the second upper roller 18, the third lower roller 21, the third upper roller 22, the fourth drive roller 25, and the fifth drive roller 29.

The control section 80 is connected to an interface section 86, receives various data and signals input from an external device 87 such as a personal computer, and outputs read data read by the scanner 1 to the external device 87.

Various data and various programs for controlling the scanner 1 are recorded in the storage section 85.

The calculation section 81 reads and executes various programs stored in the storage section 85, thereby functioning as a transport control section 82, a reading control section 83, a multi-feed determination section 84, and the like.

The transport control section 82 feeds, transports, and discharges the document P by controlling the transport motor 47 to rotate the above-described plurality of rollers.

The reading control section 83 controls the first reading section 32 and the second reading section 33 during transport of the document P, and causes them to read an image of the document P.

The multi-feed determination section 84 is a state detection section that detects the state of the document P, and in the present embodiment, determines multi-feed of the document P based on a receive signal input from a receiving circuit 59 (described later).

Specifically, when the voltage value of the receive signal is smaller than a predetermined threshold, it is determined that the documents P are multi-fed. When the multi-feed determination section 84 determines multi-feed, the transport control section 82 stops transport of the document P.

Basic Configuration of Ultrasonic Detection Section

Next, the basic configuration of the ultrasonic detection section 50 will be described.

Figure 22:
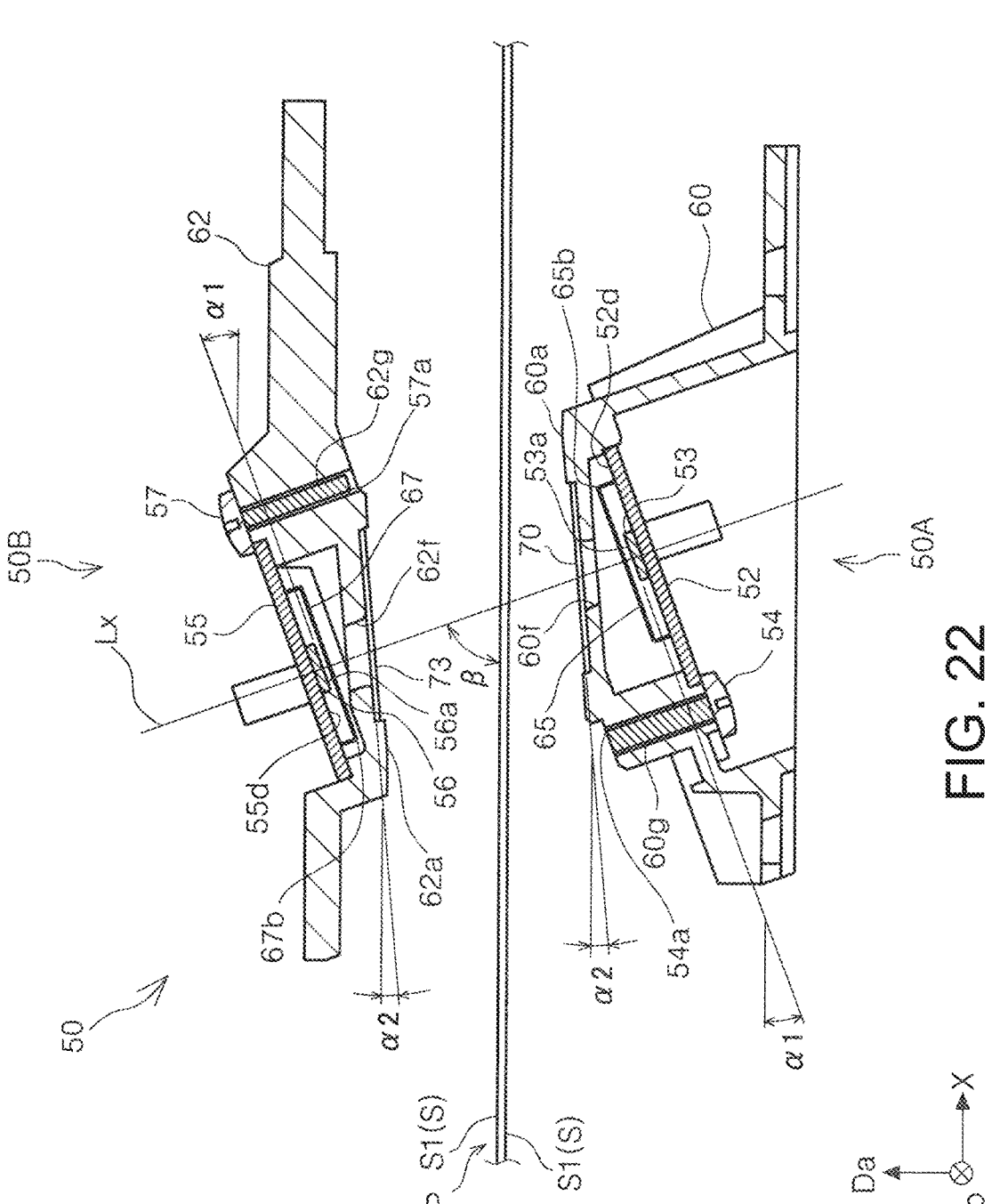
FIG. 22 is a cross-sectional view showing a configuration of the ultrasonic detection section.

In FIG. 22, the ultrasonic detection section 50 includes a pair of ultrasonic elements. One of the pair of ultrasonic elements is a transmission sensor chip 53, and the transmission sensor chip 53 transmits an ultrasonic wave. The other of the pair of ultrasonic elements is a receiving sensor chip 56, and the receiving sensor chip 56 receives the ultrasonic wave.

The transmission sensor chip 53 and the receiving sensor chip 56 face each other on a sensor central axis Lx, which is an example of a first axis, and are disposed with the document P, which is being transported in the downstream feeding path R1, interposed therebetween.

The ultrasonic detection section 50 emits the ultrasonic wave from the transmission sensor chip 53 toward the first surface S1 of the document P being fed. The ultrasonic waves emitted from the transmission sensor chip 53 is input to the document P, and the ultrasonic waves transmitted through the document P is received by the receiving sensor chip 56. When the ultrasonic waves are received by the receiving sensor chip 56, the receive signal corresponding to a sound pressure of the received ultrasonic waves is output, and multi-feed of the document P is determined based on the signal strength of the receive signal.

The sensor central axis Lx is an axis passing through the center of the transmission sensor chip 53 and the center of the receiving sensor chip 56, and is a transmit/receive direction of ultrasonic waves. The sensor central axis Lx is orthogonal to a transmission surface 53a, which is the upper surface of the transmission sensor chip 53, and the receiving surface 56a, which is the upper surface of the receiving sensor chip 56.

The sensor central axis Lx is inclined at an angle β with respect to the document surface S of the document P.

Here, when the sensor central axis Lx coincides with the normal direction of the document surface S, that is, when the angle β is 90°, there is a possibility that the ultrasonic waves transmitted from the transmission sensor chip 53 are reflected multiple times between the document P and the transmission sensor chip 53. There is a concern that the ultrasonic waves, which pass through the document P, may be reflected multiple times between the receiving sensor chip 56 and the document P. In this case, in the receiving sensor chip 56, ultrasonic waves that were reflected multiple times between document P and transmission sensor chip 53 and ultrasonic waves that were reflected multiple times between the receiving sensor chip 56 and the document P are received by the receiving sensor chip 56 in addition to ultrasonic waves that are transmitted from the transmission sensor chip 53, pass through the document P, and received by the receiving sensor chip 56 and, because of this, accurate multi-feed detection is not possible.

On the other hand, by inclining the sensor central axis Lx with respect to the normal line of the document surface S of the document P, it is possible to reduce the receiving of the unnecessary ultrasonic wave components such as the multiply-reflected ultrasonic waves and to perform multi-feed detection with high accuracy.

Note that the angle β can be set to 60° to 80°, and is set to 70° in the present embodiment.

Note that when the area of the transmission surface 53a of the transmission sensor chip 53 is small, the beam diameter of the ultrasonic waves becomes small. In this case, when the distance between the transmission sensor chip 53 and the receiving sensor chip 56, that is, the distance along the sensor central axis Lx, is short, the sound pressure of the ultrasonic waves will be greatly reduced if the transmission sensor chip 53 is deviated from the sensor central axis Lx due to attachment error. Similarly, when the area of the receiving surface 56a of the receiving sensor chip 56 is small, the sound pressure will greatly reduced if the receiving surface 56a deviates from the sensor central axis Lx. Therefore, although it is desirable to secure distance between the transmission sensor chip 53 and the receiving sensor chip 56 to some extent, this also reduces the sound pressure if the distance between the transmission sensor chip 53 and the receiving sensor chip 56 becomes too great. In the present embodiment, in consideration of the above viewpoint, the distance along the sensor central axis Lx between the transmission sensor chip 53 and the receiving sensor chip 56, that is, the inter-sensor distance, is set in the range of 15.0 mm to 30.0 mm, and is set to 24.9 mm as an example.
Configuration of Sensor Chip The configuration of the ultrasonic detection section 50 will be further described.

Figure 3:
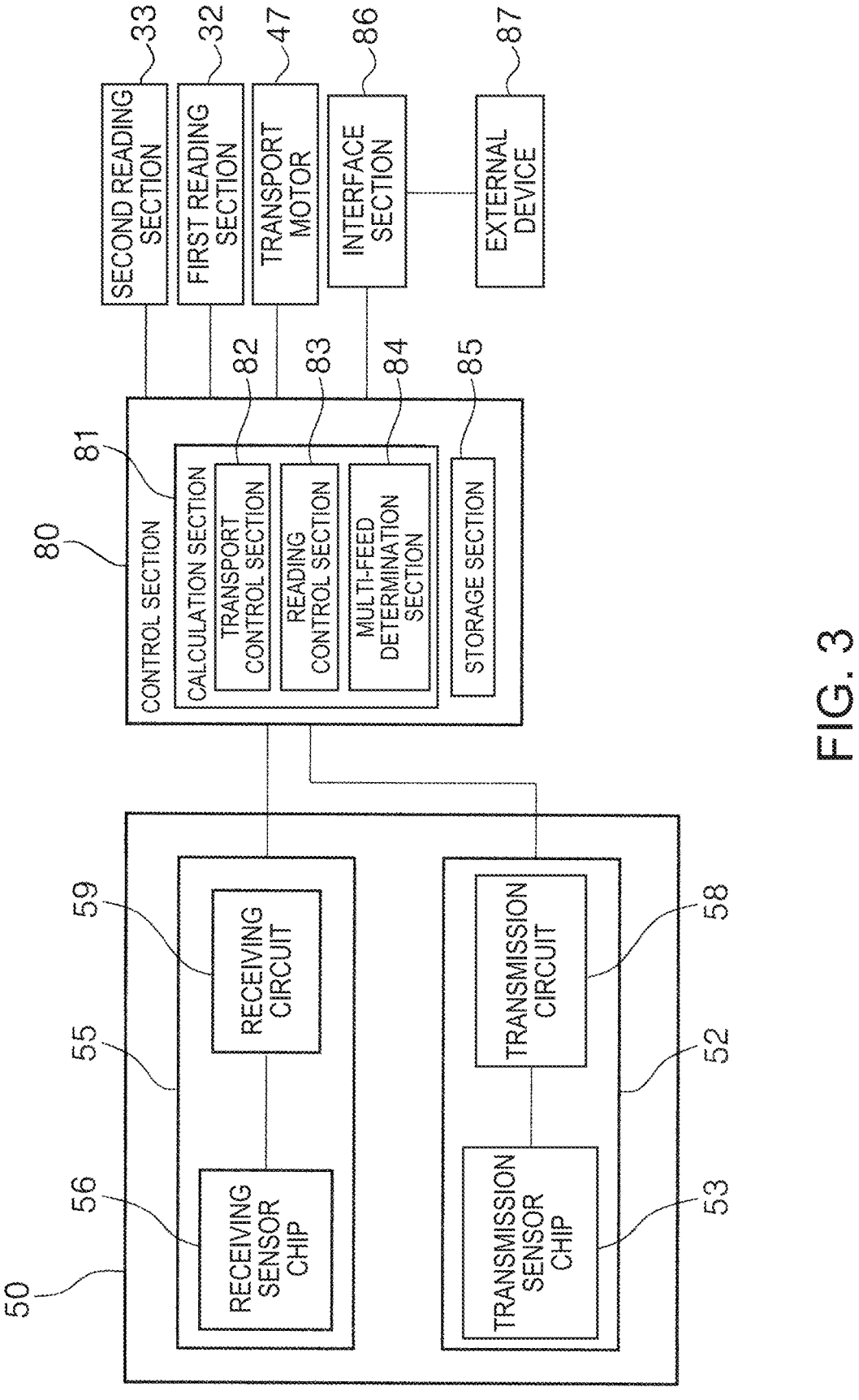
FIG. 3 is a block diagram showing a control system of the scanner.

As shown in FIG. 3, a transmission circuit 58 for controlling the transmission sensor chip 53 is provided on a transmission board 52 and the receiving circuit 59 for controlling the receiving sensor chip 56 is provided on a receiving board 55.

Figure 21:
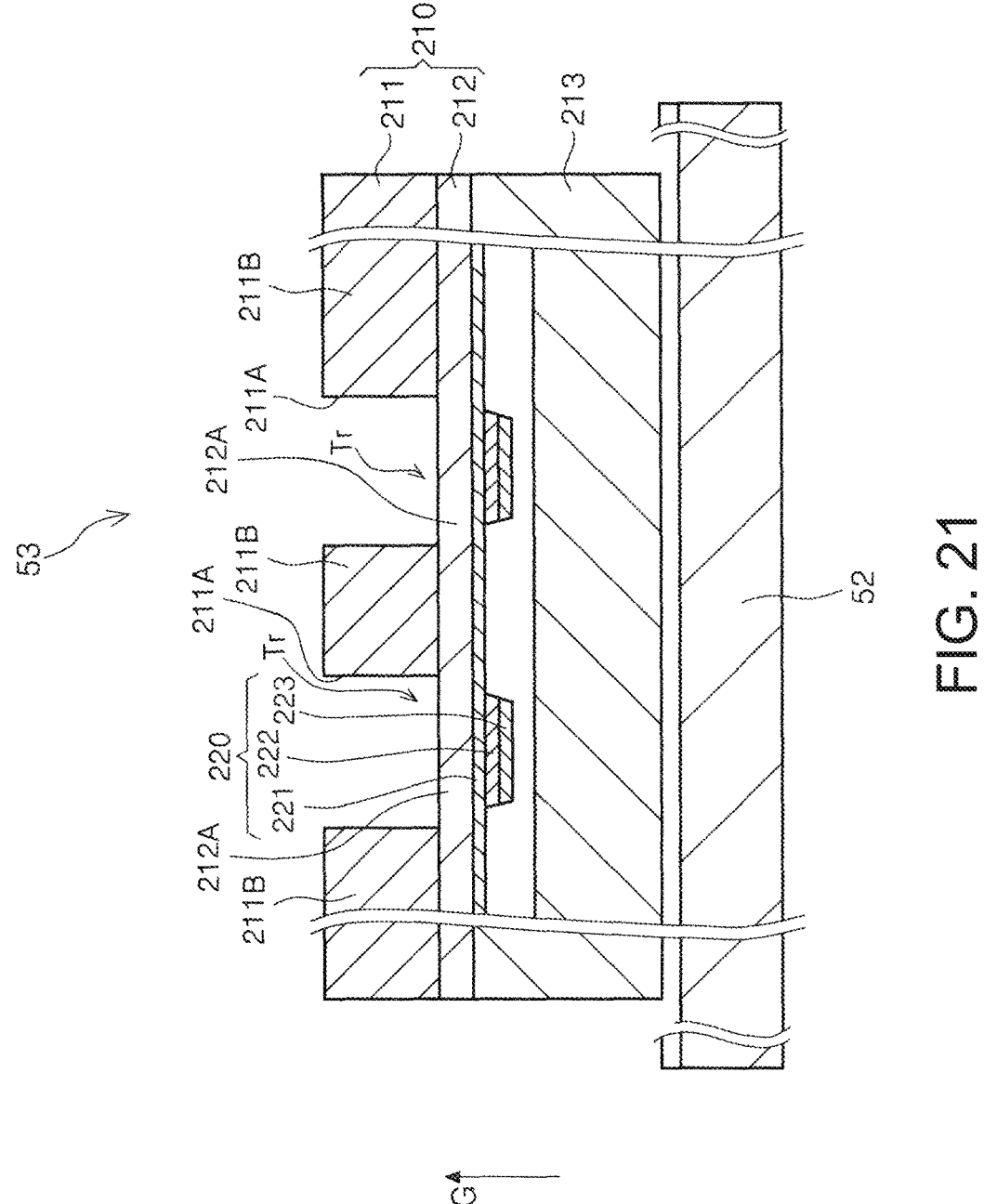
FIG. 21 is a cross-sectional view showing a structure of a transmission sensor chip.

Here, the configuration of the transmission sensor chip 53 will be described with reference to FIG. 21.

The transmission sensor chip 53 is configured to include a base board 213, an element board 210, and piezoelectric elements 220.

The element board 210 includes a board main body section 211 and a diaphragm 212 provided on one surface side of the board main body section 211. In the following description, the board thickness direction of the element board 210 is referred to as a G direction. The G direction is a direction in which the ultrasonic waves are transmitted, and is parallel to the sensor central axis Lx.

The board main body section 211 is a board provided on the diaphragm 212 and is formed of a semiconductor board such as Si. Opening sections 211A, which penetrate through the board main body section 211 along the G direction, are provided in the board main body section 211.

The diaphragm 212 is supported by the base board 213. The diaphragm 212 and the base board 213 are bonded and fixed to each other. A space for disposing the piezoelectric element 220 is provided between the base board 213 and the diaphragm 212.

Note that the diaphragm 212 may be fixed in a state of being laminated on the base board 213.

The diaphragm 212 is formed of a SiO2, a laminate of a SiO2 and a ZrO2, or the like, and is provided on the −G side of the board main body section 211. The diaphragm 212 closes the −G side of the opening section 211A. A portion of the diaphragm 212 overlapping the opening section 211A as viewed from the G direction constitutes a vibration section 212A.

The piezoelectric element 220 is provided on the diaphragm 212 at a position overlapping the vibration section 212A as viewed from the G direction. The piezoelectric element 220 is configured by laminating a first electrode 221, a piezoelectric film 222, and a second electrode 223 in this order on the diaphragm 212.

Here, one vibration section 212A and the piezoelectric element 220 provided on the vibration section 212A constitute one ultrasonic transducer Tr. Although not shown, in the present embodiment, the transmission sensor chip 53 is configured by arranging such an ultrasonic transducer Tr in a two dimensional array structure. The transmission circuit 58 (see FIG. 3) is electrically connected to each of the ultrasonic transducers Tr of the transmission sensor chip 53 and generates a drive signal for driving each of the ultrasonic transducers Tr.

In the transmission sensor chip 53, the piezoelectric film 222 expands and contracts when a pulse wave voltage of a predetermined frequency is applied between the first electrode 221 and the second electrode 223 of each ultrasonic transducer Tr. By this, the vibration section 212A vibrates at frequencies corresponding to the opening widths of the opening section 211A and the like, and the ultrasonic waves are transmitted from the vibration section 212A toward the +G side along the sensor central axis Lx. That is, the surface of the element board 210 on the +G side is the transmission surface 53a of the transmission sensor chip 53 for the ultrasonic waves.

Note that the base board 213 of the transmission sensor chip 53 is attached to the transmission board 52 via a resist with a non-conductive adhesive. On the transmission board 52, at least one of a chip inclination prevention pad (not shown) to prevent the transmission sensor chip 53 from inclining with respect to the transmission board 52, a positioning mark section (not shown) of the transmission sensor chip 53 with respect to the transmission board 52, and an adhesive leakage suppressing section (not shown) to suppress the non-conductive adhesive from overflowing is provided. Furthermore, the transmission sensor chip 53 is stuck to the transmission board 52 by silver paste at a position different from the chip inclination prevention pad (not shown) and the chip inclination prevention pad (not shown) is not used for conduction.

Note that the configuration of the receiving sensor chip 56 is not shown, the receiving sensor chip 56 has the same configuration as the transmission sensor chip 53 described above. In this case, the surface of the element board 210 on the +G side serves as the receiving surface 56a of the receiving sensor chip 56 for the receiving ultrasonic waves. When an ultrasonic wave reaches the ultrasonic transducer Tr, the diaphragm 212 vibrates according to the sound pressure of the ultrasonic waves. The piezoelectric film 222 is deformed by the vibration of the diaphragm 212, and a potential difference is generated between the first electrode 221 and the second electrode 223. By this, the receive signal corresponding to the sound pressure of the received ultrasonic wave is output from the first electrode 221 of the ultrasonic transducer Tr. That is, the ultrasonic waves are detected.

As the receiving circuit 59 for processing the receive signal (see FIG. 3), a general circuit for processing the received signal inputted by receiving the ultrasonic waves can be used. For example, the receiving circuit 59 can be configured by a band-pass filter, an amplifier, a sample-and-hold circuit, a comparator, and the like (not shown).

Configuration of Transmission Sensor Unit and Receiving Sensor Unit

Next, the configuration of the transmission unit 50A and the receiving unit 50B will be described.

FIG. 4 shows a state in which the second unit 4 is opened with respect to the first unit 3. When the second unit 4 is opened with respect to the first unit 3, the inside of the first unit 3 and the inside of the second unit 4 are exposed.

A transmission-side path forming member 36 is provided inside the first unit 3, and when the second unit 4 is opened with respect to the first unit 3, the transmission-side path forming member 36 is exposed.

A receiving-side path forming member 39 is provided inside the second unit 4, and when the second unit 4 is opened with respect to the first unit 3, the receiving-side path forming member 39 is exposed.

The transmission-side path forming member 36 and the receiving-side path forming member 39 form a part of the upstream feeding path R0, the downstream feeding path R1, and the reading transport path R2.

Figure 5:
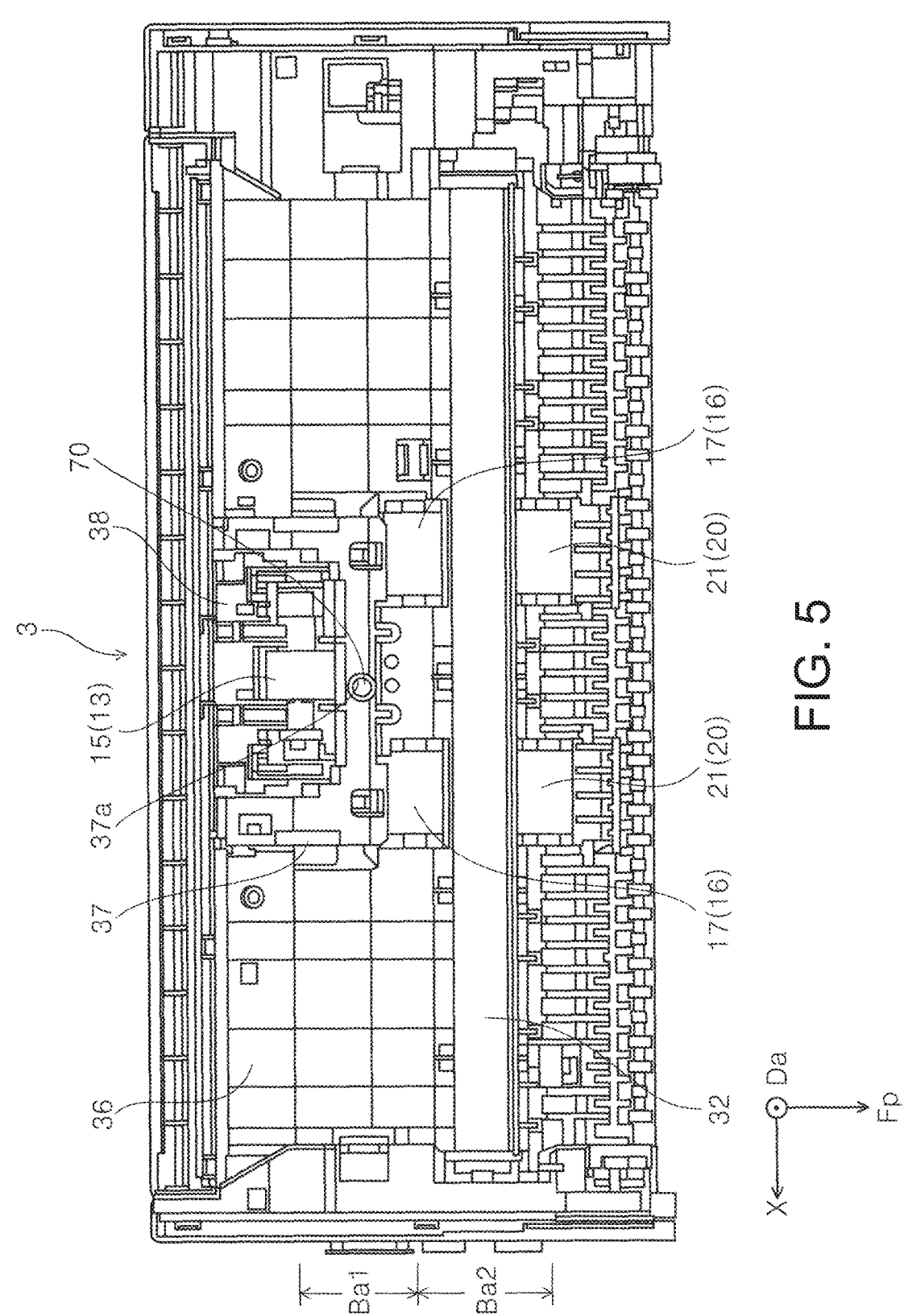
FIG. 5 is a plan view of the first unit.
Figure 6:
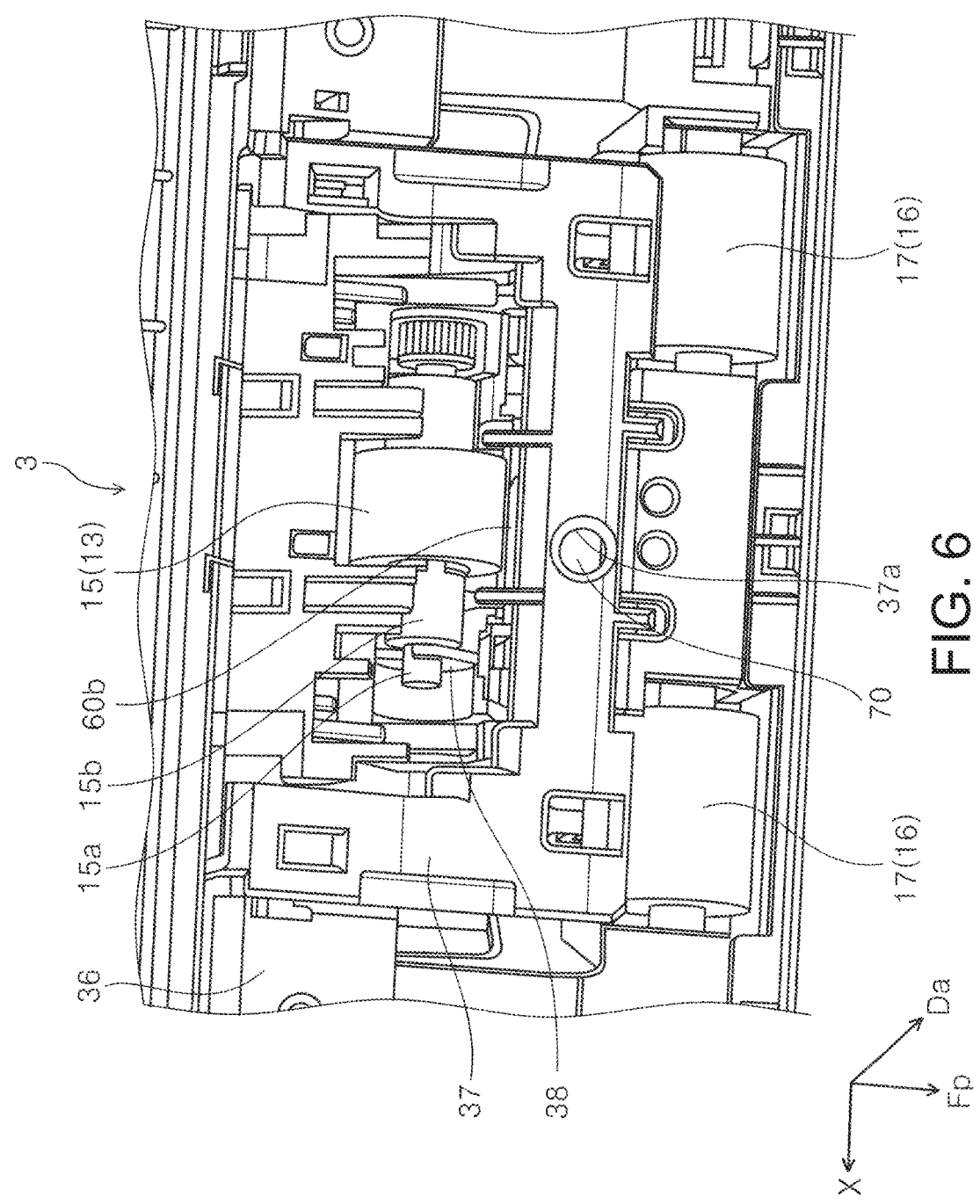
FIG. 6 is a perspective view of a state in which a cover provided on the first unit is mounted.
Figure 7:
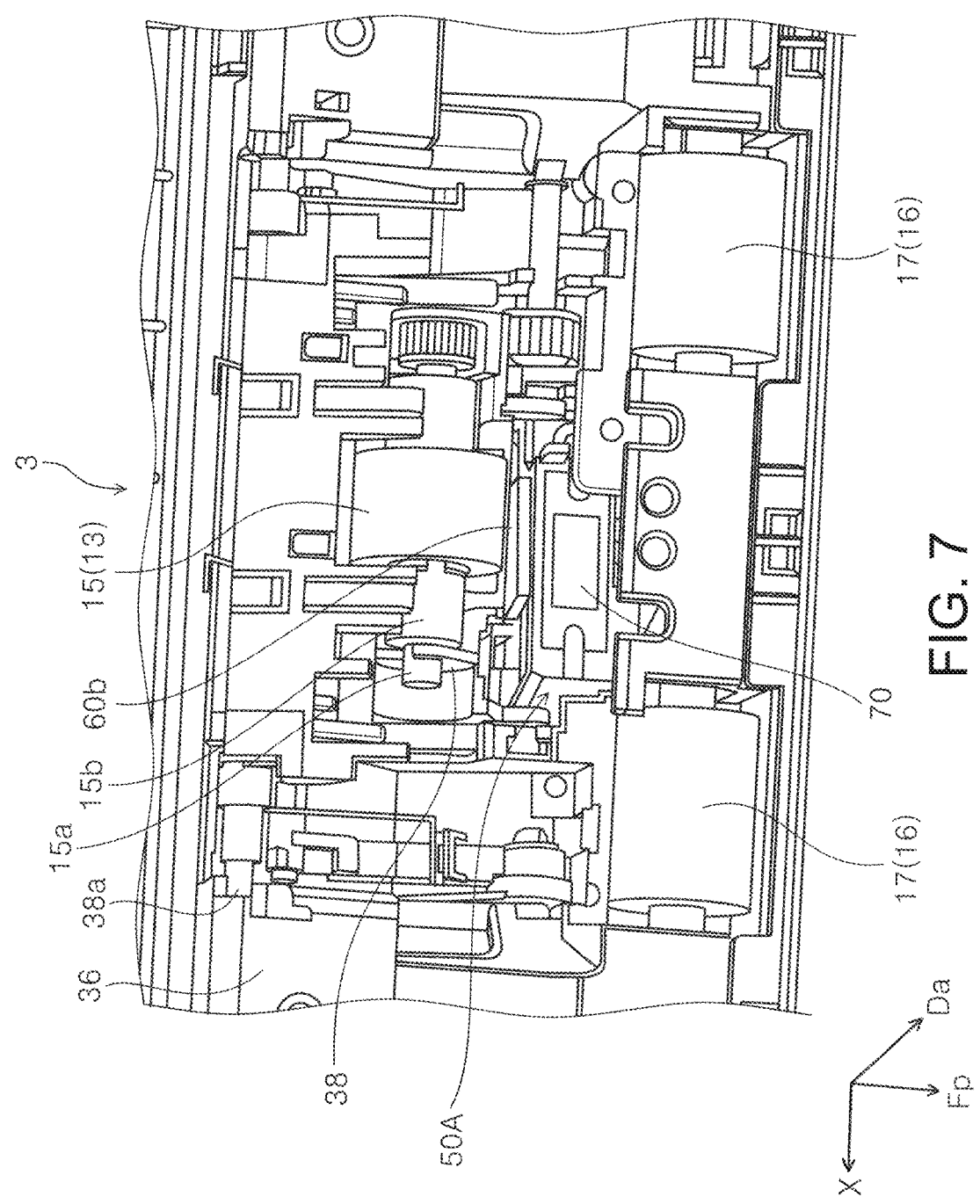
FIG. 7 is a perspective view of a state in which the cover provided on the first unit is removed.

As shown in FIG. 5, a cover 37 is provided on the transmission-side path forming member 36. The cover 37 is provided to be attachable to and detachable from the transmission-side path forming member 36 so as to be able to take a state of being attached as shown in FIG. 5 and FIG. 6 and a state of being detached as shown in FIG. 7. The cover 37 is provided to be attachable to the transmission-side path forming member 36 by a snap-fit structure (not shown).

A circular opening 37a is formed in the cover 37, and the sensor central axis Lx of the ultrasonic detection section 50 is configured to pass through the vicinity of the center of the opening 37a. Inside the opening 37a, a part of a first protection member 70 (to be described later) is exposed.

The transmission unit 50A is provided inside the cover 37, and when the cover 37 is detached, the transmission unit 50A is exposed as shown in FIG. 7. Note that as shown in FIG. 6, a part of the transmission unit 50A is also exposed in the state where the cover 37 is attached, but when the cover 37 is opened, the transmission unit 50A is exposed more largely. In the attached state of the cover 37 shown in FIG. 6, a part of the first wall section 60b of a transmission board holder 60 (to be described later) is exposed.

Note that a roller holding member 38 for holding the separation roller 15 is provided inside the cover 37, and when the cover 37 is detached, the roller holding member 38 can be detached so that the separation roller 15 can be replaced together with the roller holding member 38.

Note that in FIG. 6, reference symbol 15a denotes a rotation shaft of the separation roller 15, and reference symbol 15b denotes a torque limiter that applies separation torque to the separation roller 15.

Note that in FIG. 5, reference symbol Ba1 denotes the distance between the center of the rotation axis of the separation roller 15 and the center of the rotation axis of the second lower roller 17, that is, the inter-axial distance, and reference symbol Ba2 denotes the distance between the center of the rotation axis of the second lower roller 17 and the center of the rotation axis of the third lower roller 21, that is, the inter-axial distance.

In the present embodiment, the inter-axial distance Ba1 is shorter than the inter-axial distance Ba2. In other words, the path length of the downstream feeding path R1 is shorter than the path length of the reading transport path R2.

Note that in the present embodiment, the inter-axial distance Ba1 is 29.1 mm, and the inter-axial distance Ba2 is 34.0 mm.

Figure 8:
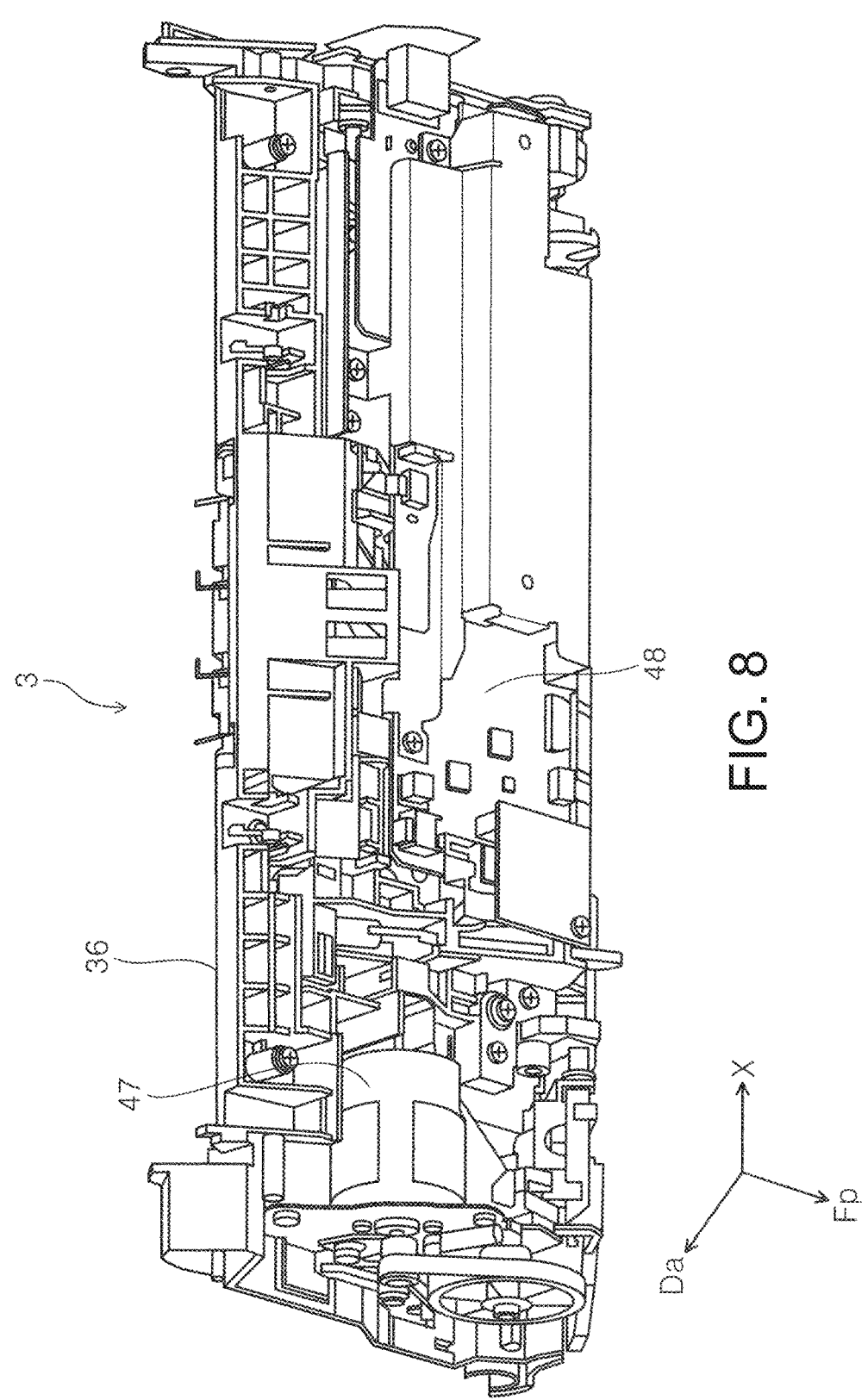
FIG. 8 is a perspective view of the first unit as viewed from the rear surface side.

Next, as shown in FIG. 8, the transport motor 47 and the main board 48 are provided on the −Da direction side of the transmission-side path forming member 36. The transport motor 47 is provided at an end portion in the −X direction on the rear surface side of the transmission-side path forming member 36.

Figure 9:
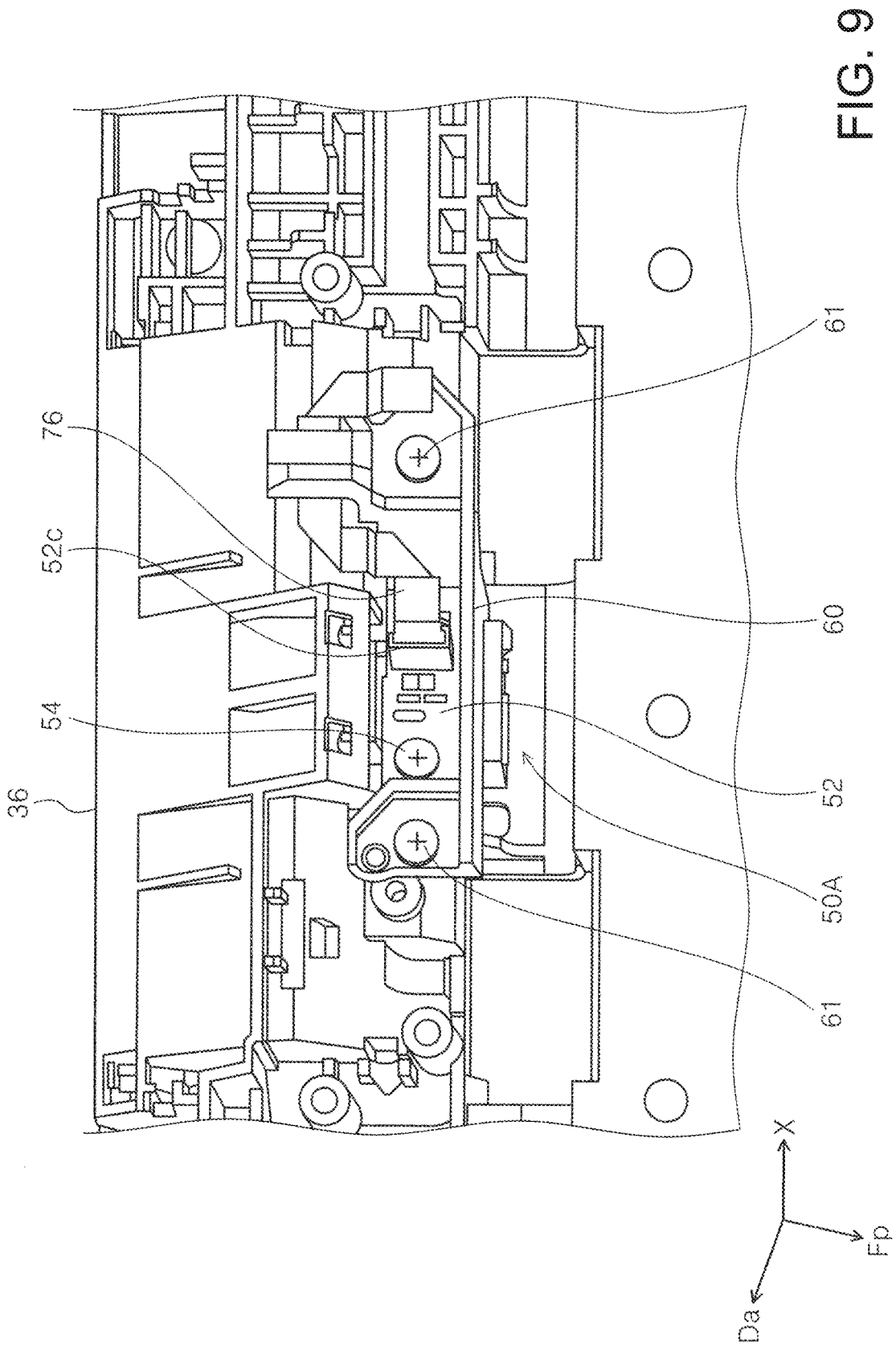
FIG. 9 is a perspective view showing a fixed state of a transmission board holder.

The main board 48 constitutes the control section 80 described above. As shown in FIG. 9, the transmission unit 50A is provided between the main board 48 and the transmission-side path forming member 36.

Although the configuration of the transmission unit 50A will be described later in detail, the transmission unit 50A uses the transmission board holder 60 as a base body, and the transmission board holder 60 is fixed to the transmission-side path forming member 36 by screws 61, 61.

Figure 10:
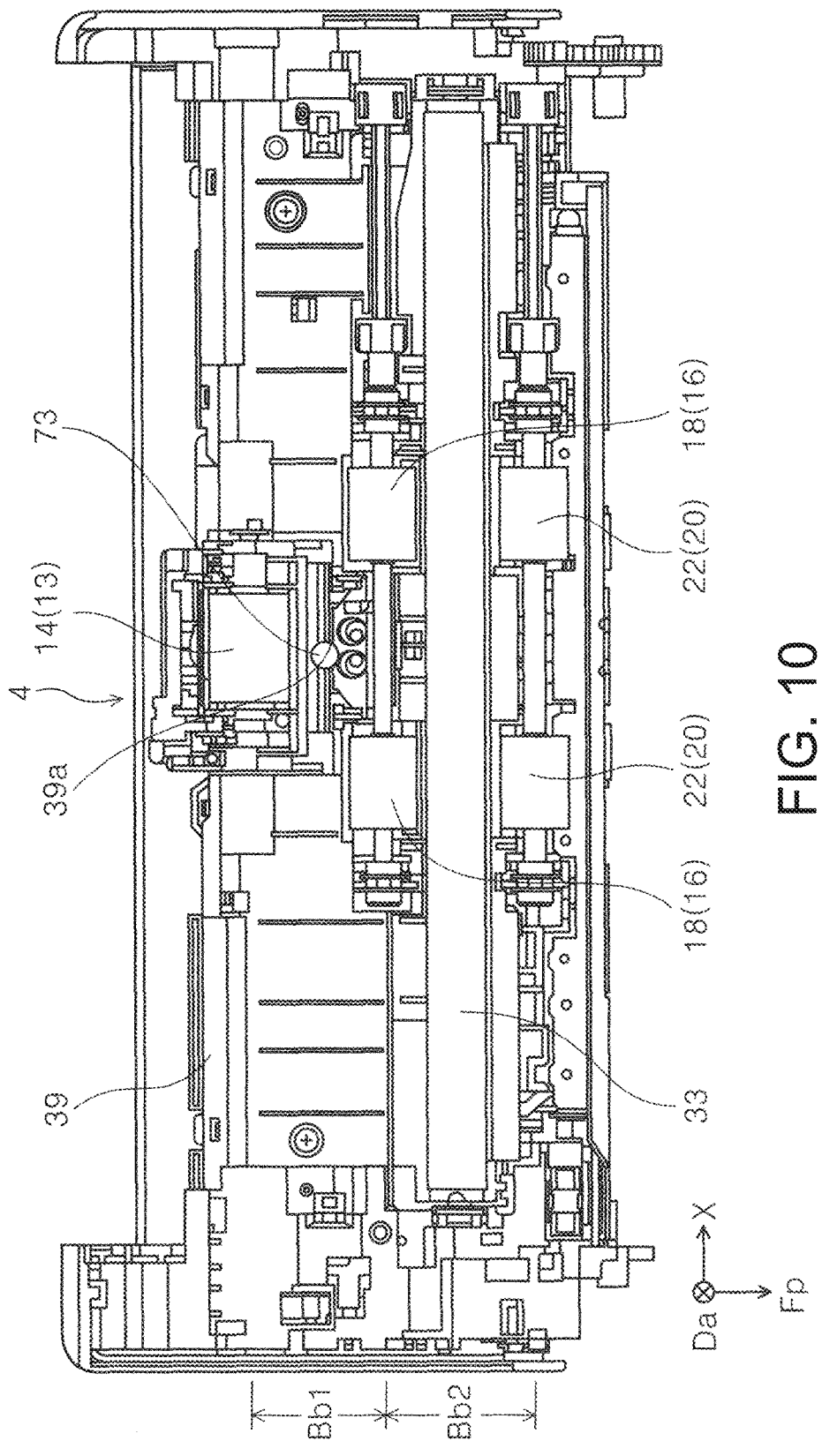
FIG. 10 is a plan view of the second unit.

Next, as shown in FIG. 10, a circular opening 39a is formed in the receiving-side path forming member 39, and the sensor central axis Lx of the ultrasonic detection section 50 is configured to pass through the vicinity of the center of the opening 39a. Inside the opening 39a, a part of a second protection member 73 (to be described later) is exposed. Note that in FIG. 10, reference symbol Bb1 denotes the distance between the center of the rotation axis of the feed roller 14 and the center of the rotation axis of the second upper roller 18, that is, the inter-axial distance, and reference symbol Bb2 denotes the distance between the center of the rotation axis of the second upper roller 18 and the center of the rotation axis of the third upper roller 22, that is, the inter-axial distance.

In the present embodiment, the inter-axial distance Bb1 is shorter than the inter-axial distance Bb2. In other words, the path length of the downstream feeding path R1 is shorter than the path length of the reading transport path R2.

Note that in the present embodiment, the inter-axial distance Bb1 is 30.0 mm, and the inter-axial distance Bb2 is 34.0 mm.

Figure 11:
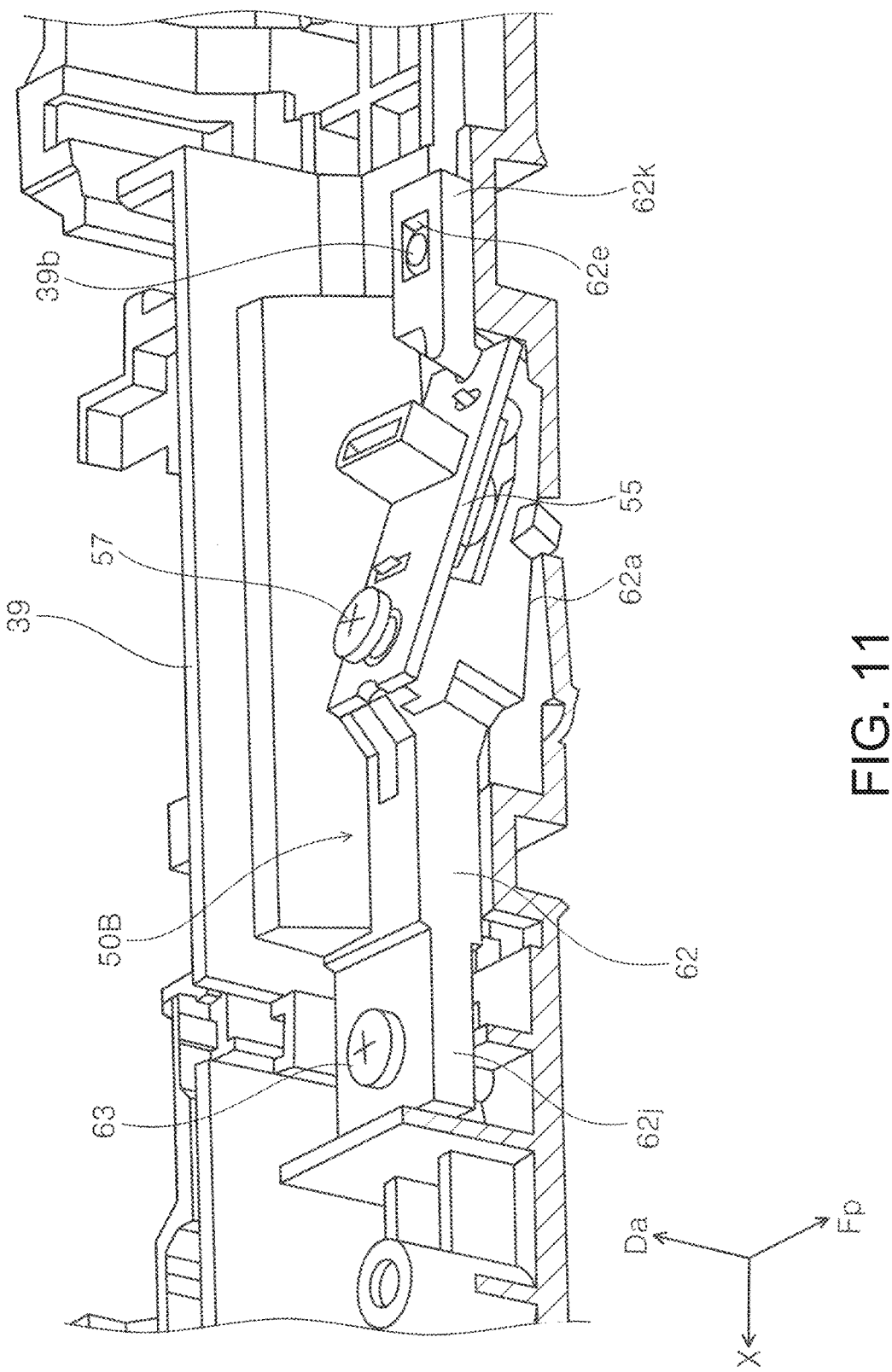
FIG. 11 is a perspective view showing a fixed state of a receiving board holder.

As shown in FIG. 11, the receiving unit 50B is provided on the +Da direction side of the receiving-side path forming member 39.

Although the configuration of the receiving unit 50B will be described in detail later, the receiving unit 50B uses a receiving board holder 62 as a base body, and a fixed section 62*j*, which is a portion constituting the receiving board holder 62, is fixed to the receiving-side path forming member 39 by a receiving-side holder fixing screw 63. Note that reference symbol 39*b* denotes a positioning section provided in the receiving-side path forming member 39, and when a hole section 62*e* formed in the positioned section 62*k* of the receiving board holder 62 is fitted to the positioning section 39*b*, the positioned section 62*k* is positioned with respect to the receiving-side path forming member 39.

Thus, the receiving board holder 62 is positioned and fixed to the receiving-side path forming member 39.

Next, the configurations of the transmission unit 50A and the receiving unit 50B will be further described with reference to FIG. 12 and subsequent drawings.

Figure 12:
FIG. 12 is a perspective view showing a positional relationship of a first roller pair, a second roller pair, a third roller pair, and an ultrasonic detection section.

As shown in FIG. 12, the ultrasonic detection section 50 is disposed in a space between the first roller pair 13 and the second roller pair 16. The separation roller 15 constituting the first roller pair 13, the transmission unit 50A, the second lower roller 17 constituting the second roller pair 16, and the third lower roller 21 constituting the third roller pair 20 are disposed in this order along the transport direction Fp. The feed roller 14 constituting the first roller pair 13, the receiving unit 50B, the second upper roller 18 constituting the second roller pair 16, and the third upper roller 22 constituting the third roller pair 20 are disposed along the transport direction Fp in this order.

Figure 13:
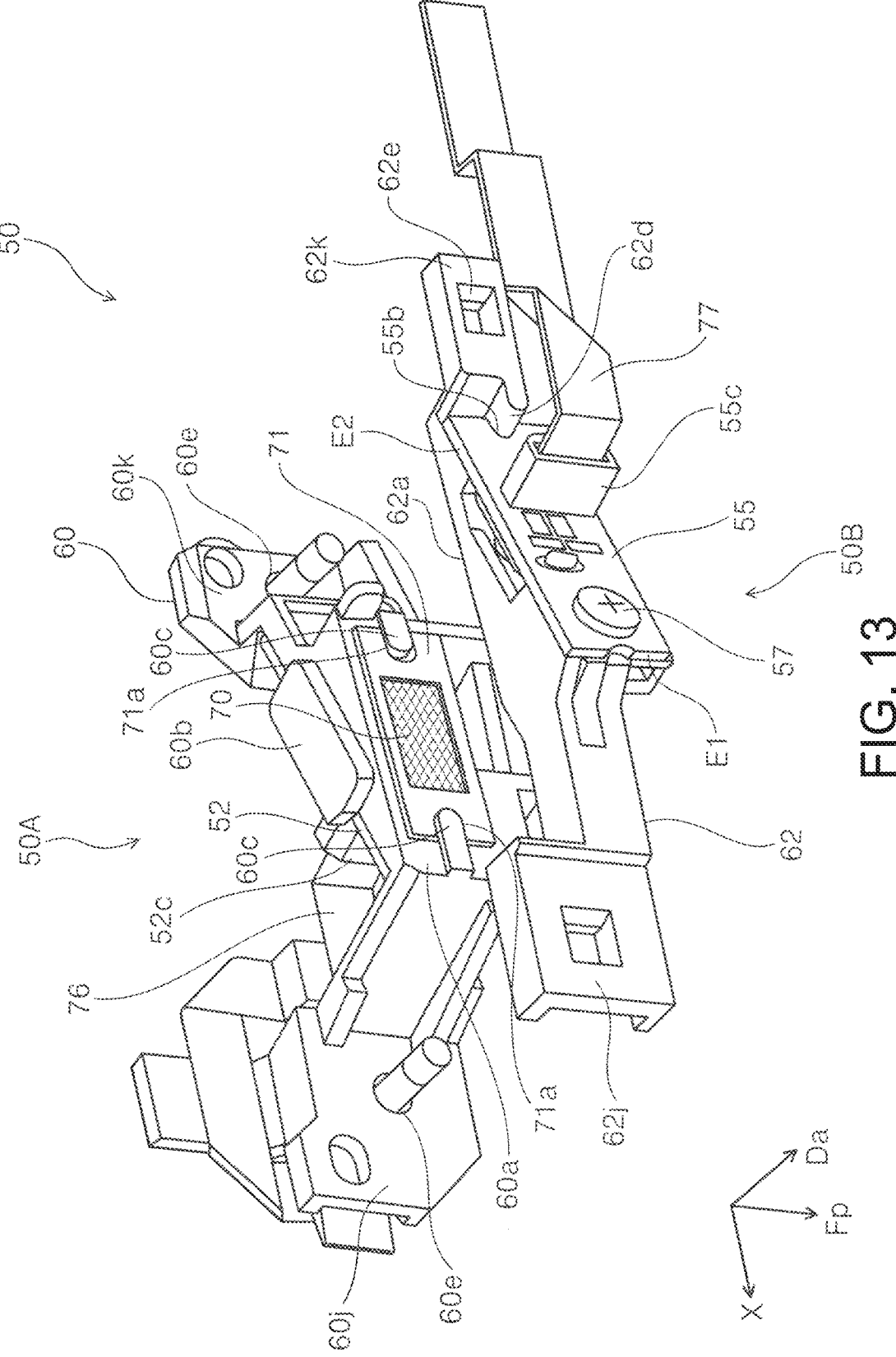
FIG. 13 is a perspective view of the ultrasonic detection section.
Figure 14:
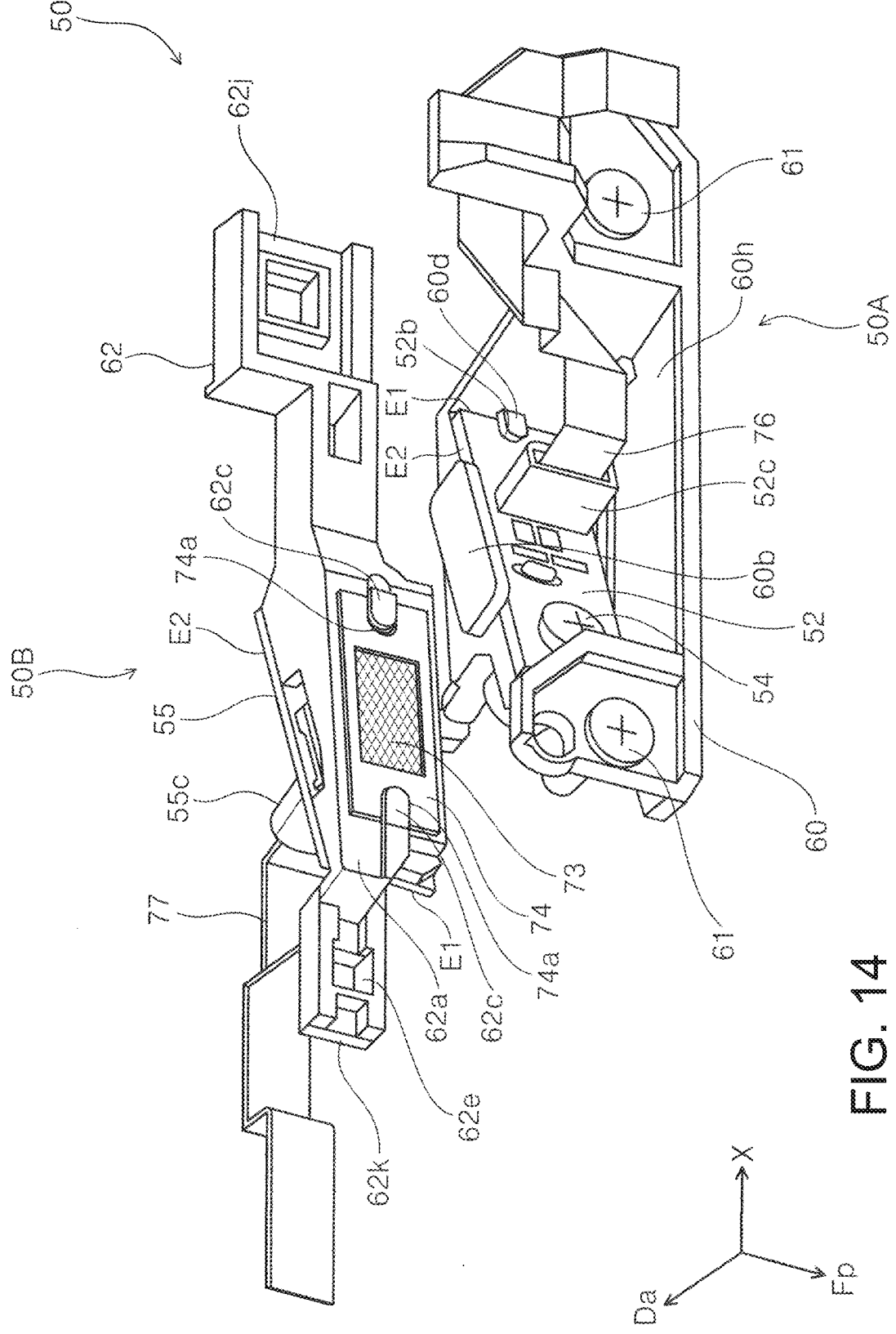
FIG. 14 is a perspective view of the ultrasonic detection section.

As shown in FIG. 13 and FIG. 14, the transmission unit 50A is configured by providing the transmission board 52 and the first protection member 70 on the transmission board holder 60.

Similarly, the receiving unit 50B is configured by providing the receiving board 55 and the second protection member 73 on the receiving board holder 62.

Figure 17:
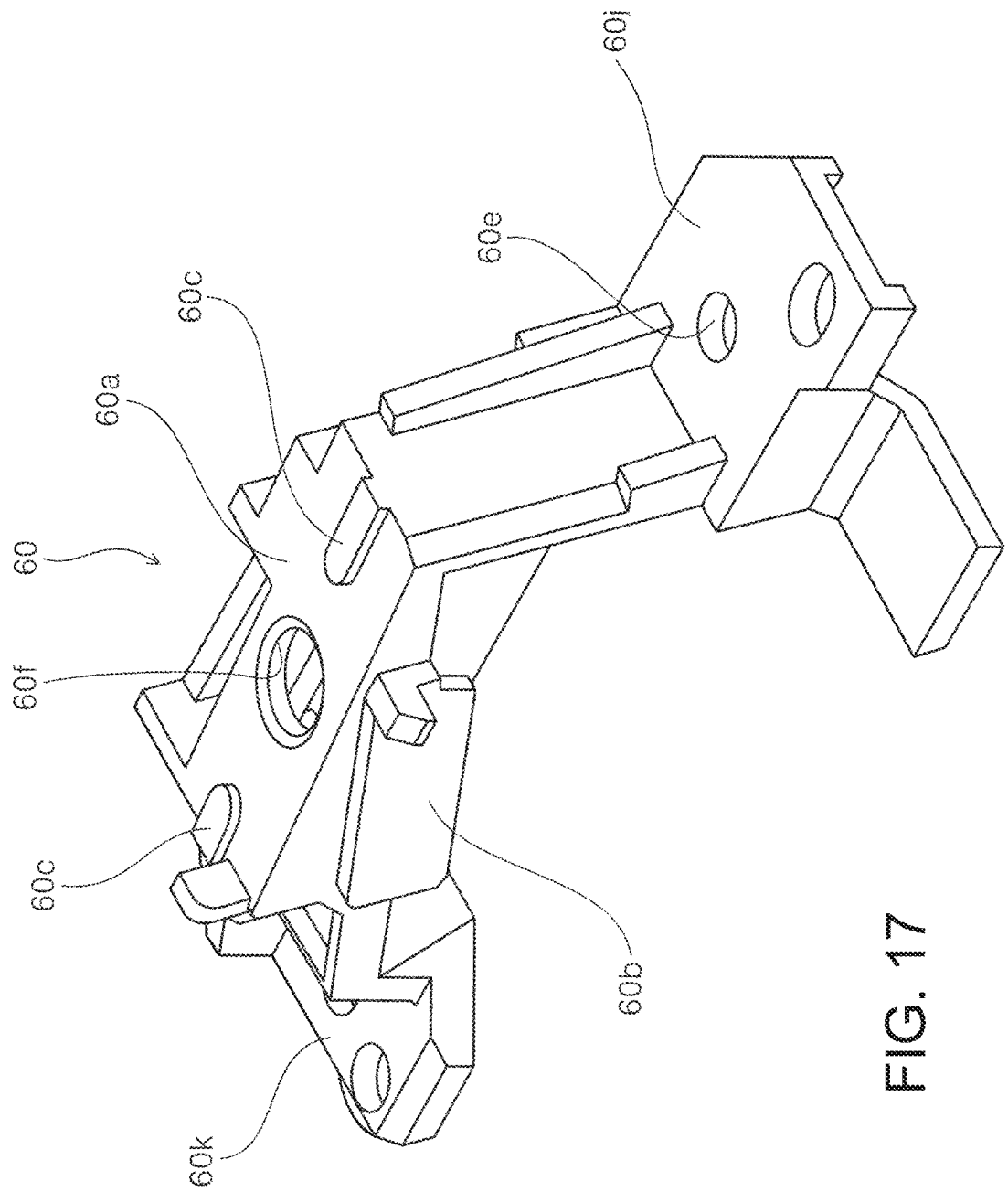
FIG. 17 is a perspective view of the transmission board holder.
Figure 18:
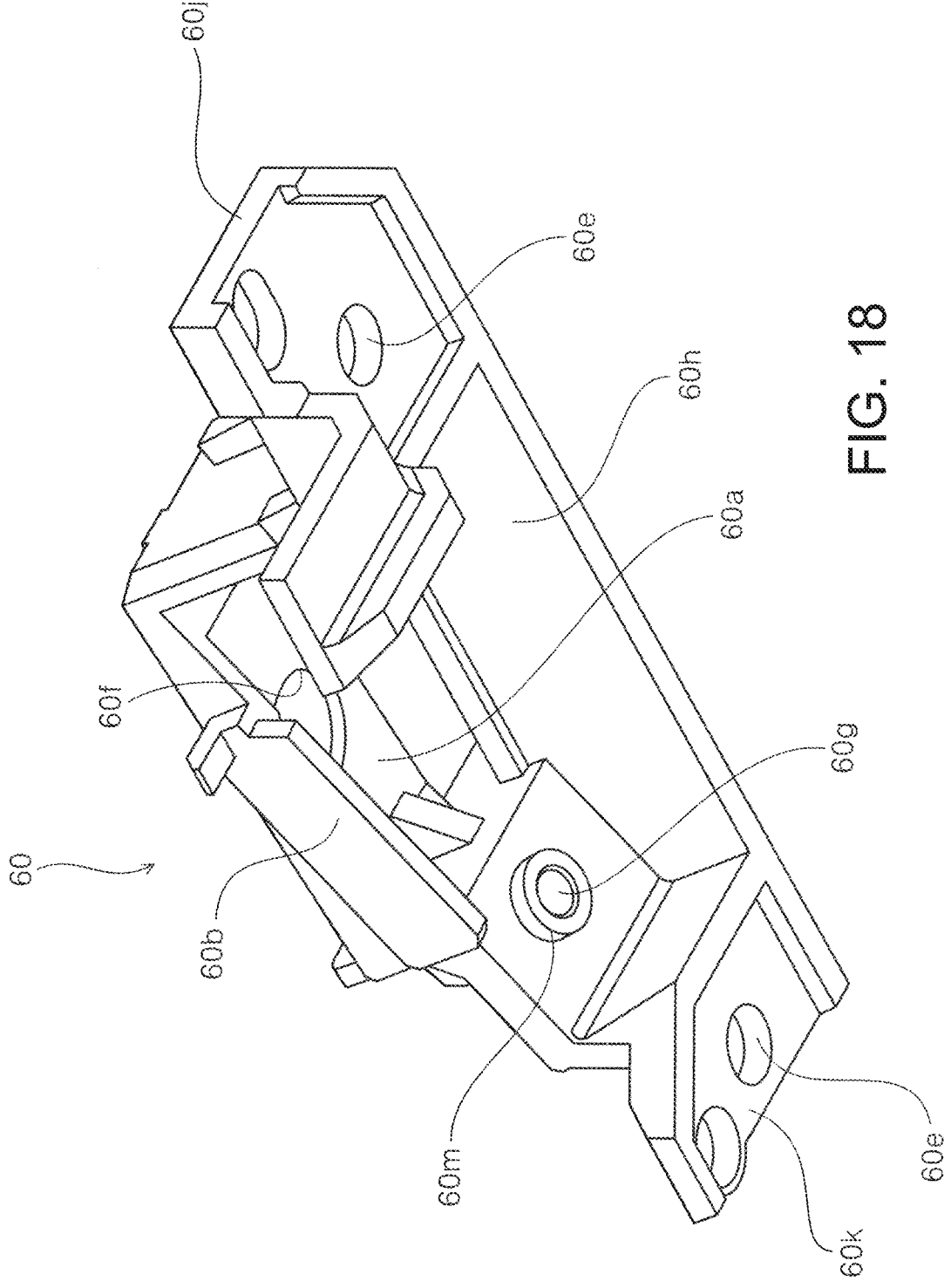
FIG. 18 is a perspective view of the transmission board holder.

As shown in FIG. 17 and FIG. 18, screw fixing sections 60*j* and 60*k* of the transmission board holder 60 each have a screw hole 60*e*, and the screws 61 described with reference to FIG. 9 pass through the screw holes 60*e*. A fixing section 60*a* is formed between the screw fixing section 60*j* and the screw fixing section 60*k* so as to be positioned in the +Da direction from the screw fixing sections 60*j* and 60*k*. The fixing section 60*a* is a portion for fixing the first protection member 70, and a first opening 60*f* is formed in a central portion thereof (see FIG. 17, FIG. 18, and FIG. 22), and the first opening 60*f* is formed so that the sensor central axis Lx of the ultrasonic detection section 50 passes near the center of the first opening 60*f*.

Figure 19:
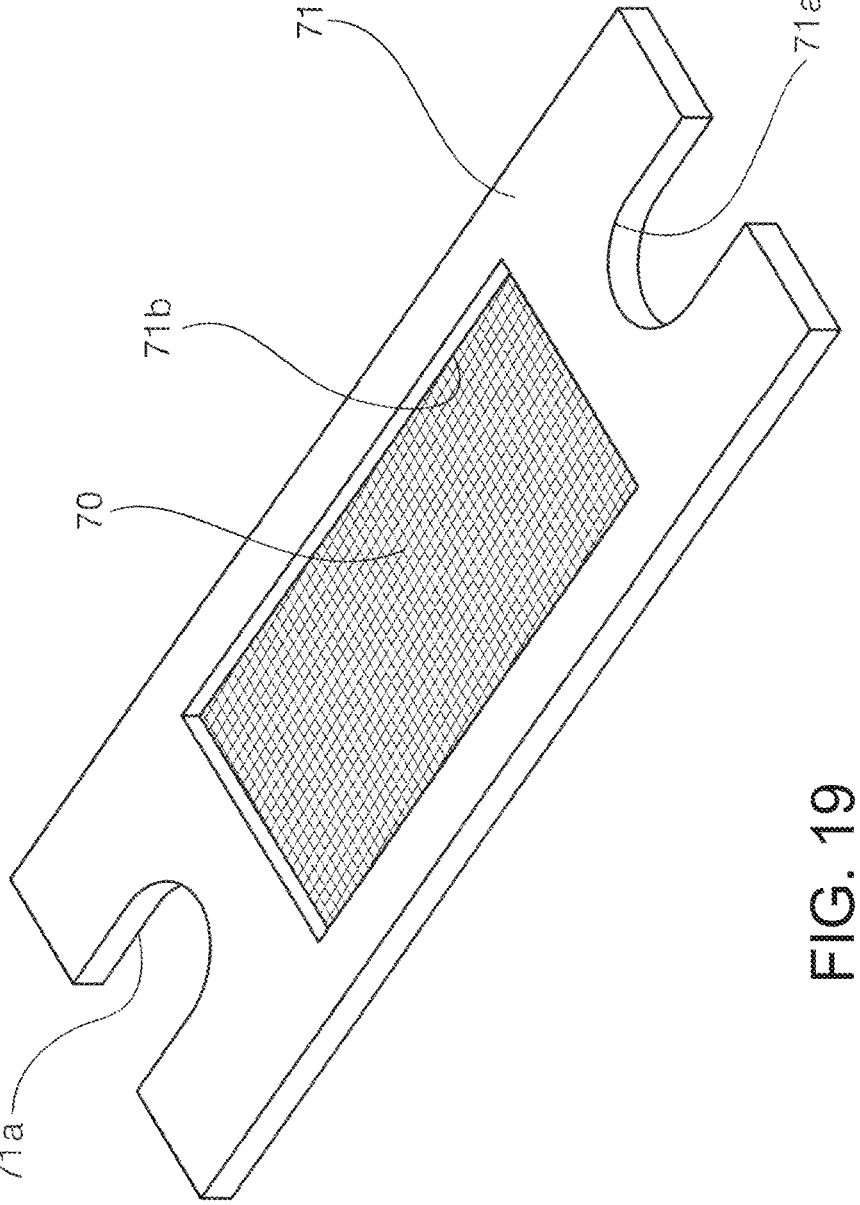
FIG. 19 is a perspective view of a protection member.

Protection member positioning sections 60*c* and 60*c* are formed on the surface of the fixing section 60*a*. As shown in FIG. 19, the first protection member 70 is held by a first holding member 71 and the first holding member 71 has recess sections 71*a* and 71*a* formed therein. When the recess sections 71*a* and 71*a* are fitted into the protection member positioning sections 60*c* and 60*c*, the first holding member 71, that is, the first protection member 70, is positioned with respect to the fixing section 60*a*.

As shown in FIG. 18, a cylindrical protrusion section 60*m* is formed on the back side of the fixing section 60*a* and a screw hole 60*g* is formed in the protrusion section 60*m*. As shown in FIG. 14, a board positioning section 60*d* is formed on the back side of the fixing section 60*a*.

Figure 15:
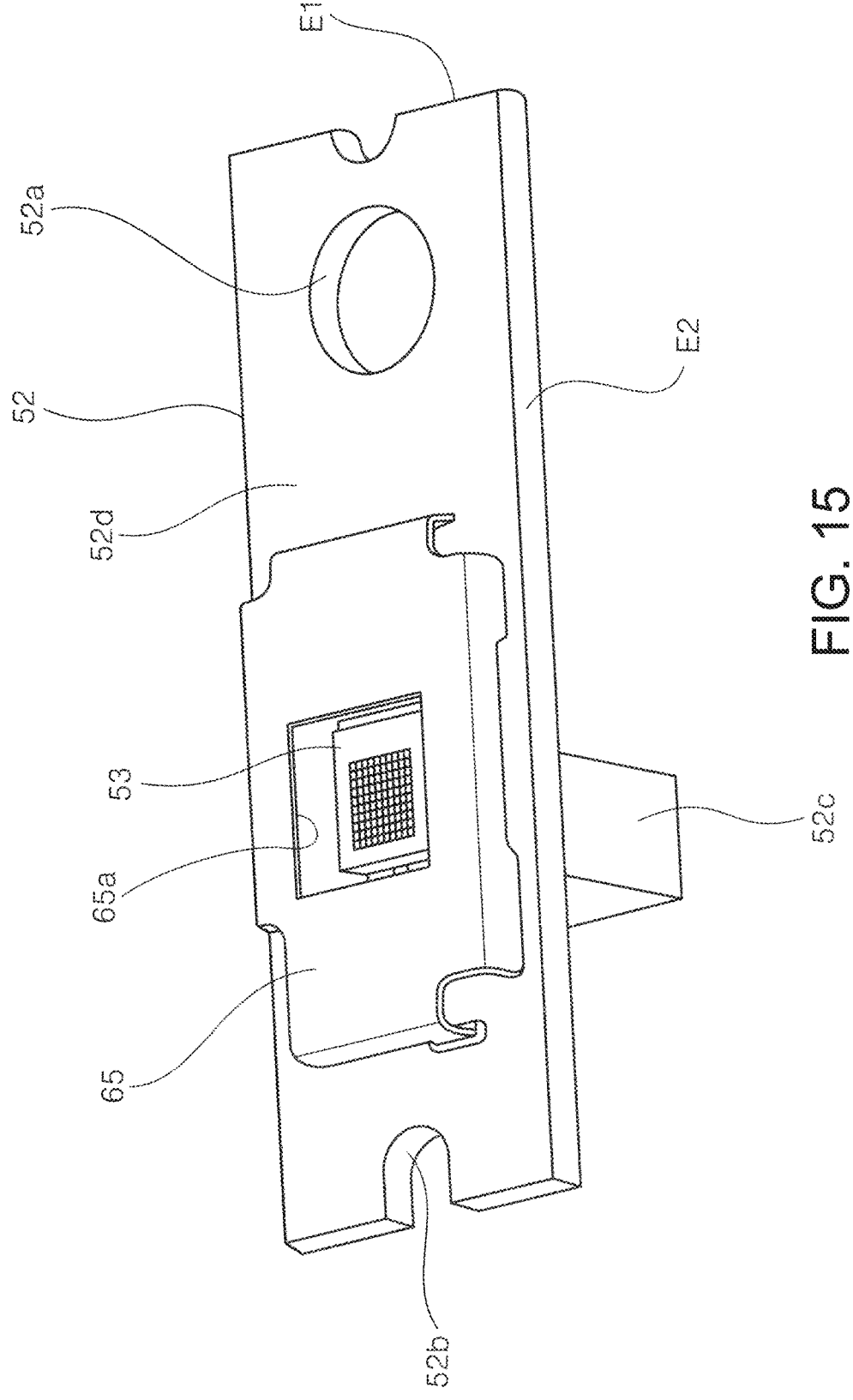
FIG. 15 is a perspective view of a transmission board.

As shown in FIG. 15, an opening 52*a* and a recess section 52*b* are formed in the transmission board 52. By this, the opening 52*a* is fitted with the protrusion section 60*m* of the transmission board holder 60, also the recess section 52*b* is fitted with the board positioning section 60*d* of the transmission board holder 60, and by this, the transmission board 52 is positioned with respect to the transmission board holder 60. Also, as shown in FIG. 14, the transmission board 52 is fixed to the transmission board holder 60 by the transmission board fixing screw 54 being fitted into the screw hole 60*g* (FIG. 18).

The transmission board holder 60 holds the transmission board 52 so that the transmission surface 53*a* of the transmission sensor chip 53 is inclined at an angle α1 with respect to the document surface S as shown in FIG. 22. By this, the transmission surface 53*a* of the transmission sensor chip 53 and the receiving surface 56*a* of the receiving sensor chip 56 become parallel to each other, and the sensor central axis Lx is inclined at an angle β with respect to the document surface S.

Note that as shown in FIG. 13, FIG. 14, FIG. 17, and FIG. 18, a first wall section 60*b* is formed upstream of the fixing section 60*a* in the transport direction Fp, and a second wall section 60*h* is formed downstream of the fixing section 60*a* in the transport direction Fp.

The first wall section 60*b* is at a position where the cover 37 is visible from the outside in a closed state as shown in FIG. 6, and functions to protect the transmission board 52 from foreign matter, liquid, or the like.

Although not shown, when viewing the first wall section 60*b* from upstream of the transport direction Fp, it is positioned in a position overlapping with a part of the transmission board 52 and all of the transmission sensor chip 53. In other words, when viewing the first wall section 60*b* from upstream of the transport direction Fp, a part of the transmission board 52 and all of the transmission sensor chip 53 are in positions hidden by the first wall section 60*b*.

Next, the receiving board holder 62 has the fixed section 62*j* and the positioned section 62*k* described with reference to FIG. 11, and a fixing section 62*a* is formed between the fixed section 62*j* and the positioned section 62*k* so as to be positioned in the −Da direction from the fixed section 62*j* and the positioned section 62*k*. The fixing section 62*a* is a portion for fixing the second protection member 73, and a second opening 62*f* is formed in a central portion thereof (see FIG. 22), and the second opening 62*f* is formed so that the sensor central axis Lx of the ultrasonic detection section 50 passes near the center of the second opening 62*f*.

As shown in FIG. 14, the protection member positioning sections 62*c* and 62*c* are formed on the surface of the fixing section 62*a*. The second protection member 73 is held by the second holding member 74 and the second holding member 74 has recess sections 74*a* and 74*a* formed therein. When the recess sections 74*a* and 74*a* are fitted onto the protection member positioning sections 62*c* and 62*c*, the second holding member 74, that is, the second protection member 73, is positioned with respect to the fixing section 62*a*.

As shown in FIG. 13, a protruding board positioning section 62*d* is formed on the back side of the fixing section 62*a*. A recess section 55*b* is formed in the receiving board 55. The recess section 55*b* is fitted onto the board positioning section 62*d*. Although not shown, the receiving board holder 62 is formed with the same protrusion section and screw hole as the protrusion section 60*m* and screw hole 60*g* of the transmission board holder 60. An opening similar to the opening 52*a* (see FIG. 15) of the transmission board 52 is formed in the receiving board 55. The opening is fitted with the protrusion section of the receiving board holder 62 and also the recess section 55b of the receiving board 55 is fitted with the board positioning section 62d of the receiving board holder 62, whereby the receiving board 55 is positioned with respect to the receiving board holder 62. Also, as shown in FIG. 13, the receiving board 55 is fixed to the receiving board holder 62 by the receiving board fixing screw 57 being fitted into the screw hole.

The receiving board holder 62 holds the receiving board 55 so that the receiving surface 56a of the receiving sensor chip 56 is inclined at the angle α1 with respect to the document surface S as shown in FIG. 22. By this, the receiving surface 56a of the receiving sensor chip 56 and the transmission surface 53a of the transmission sensor chip 53 become parallel to each other, and the sensor central axis Lx is inclined at the angle β with respect to the document surface S.

As described above, in the present embodiment, the transmission board 52 is fixed to the transmission-side path forming member 36, which is a member forming the document transport path via the transmission board holder 60, and the receiving board 55 is fixed to the receiving-side path forming member 39, which is a member forming the document transport path via the receiving board holder 62. By this, the distance between the document P and the transmission sensor chip 53 and the distance between the document P and the receiving sensor chip 56 are stabilized, and thus the detection values of the ultrasonic waves are stabilized.

Next, a configuration of the transmission board 52 will be described.

As shown in FIG. 13 to FIG. 15, the transmission board 52 is a rectangular board having short sides E1 and long sides E2, and the recess section 52b as described above is formed in one of the short sides E1. The transmission board 52 is provided so that the short side E1 is along the transport direction Fp.

The transmission sensor chip 53 is fixed in a state of being placed on the board surface 52d of the transmission board 52, and other members such as a base are not interposed between the transmission sensor chip 53 and the board surface 52d except for an adhesive.

A connector 52c is provided on the opposite side to the board surface 52d of the transmission board 52, and a transmission-side cable 76 (see FIG. 13 and FIG. 14) is connected to the connector 52c.

A first enclosing member 65 is provided on the board surface 52d of the transmission board 52. In the present embodiment, the first enclosing member 65 is formed of a metal plate material and is fixed to the transmission board 52 by an adhesive.

Figure 16:
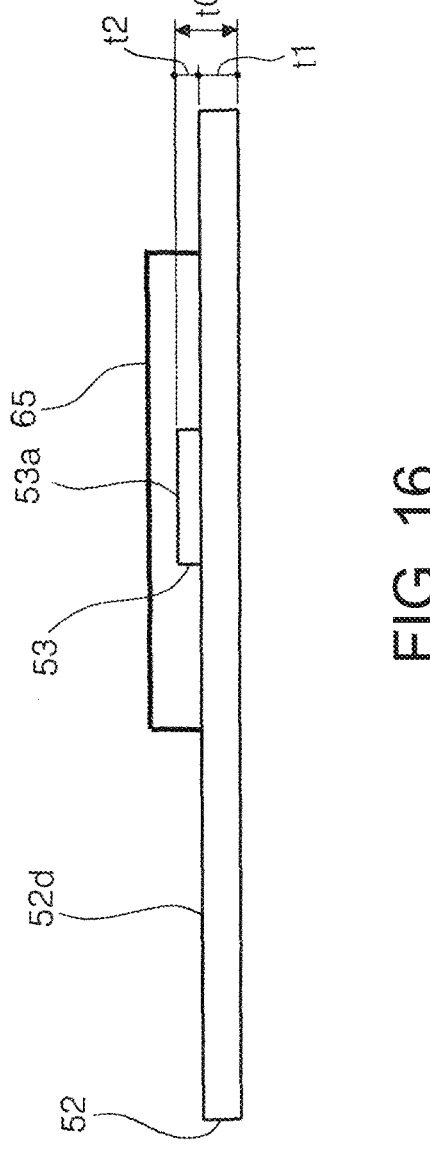
FIG. 16 is a side view of the transmission board.

The first enclosing member 65 is formed with an opening 65a, and the opening 65a is formed so that the sensor central axis Lx of the ultrasonic detection section 50 passes through the vicinity of the center of the opening 65a. The first enclosing member 65 is provided along the board surface 52d as shown in FIG. 16.

The transmission board fixing screw 54 includes a head section having a driver fitting hole, a screw section having a male screw, and a tip end section of the male screw. The screw section is attached in an attached section, specifically, in a screw hole 60g (see FIG. 18 and FIG. 22), on the same side of the board surface 52d of the transmission board 52 as the transmission sensor chip 53. Note that the screw section may be attached in an attached section, that is, in a screw hole, on the opposite side of the transmission sensor chip 53 with respect to the board surface 52d of the transmission board 52.

In a state in which the transmission board 52 is fixed with respect to the transmission board holder 60, the position of the tip end section 54a of the transmission board fixing screw 54 is positioned in the −Da direction from the position 65b of the first enclosing member 65, which is furthest in the +Da direction with respect to the normal direction Da.

The direction that is along the sensor central axis Lx and that is from the transmission unit 50A to the receiving unit 50B is defined as the +Lx direction, and the opposite direction is defined as the −Lx direction, and in a state in which the transmission board 52 is fixed to the transmission board holder 60, the position of the tip end section 54a of the transmission board fixing screw 54 is positioned in the +Lx direction from the first enclosing member 65.

The distance from the board surface 52d of the transmission board 52 to the first enclosing member 65 is shorter than the length of the screw section of the transmission board fixing screw 54.

In FIG. 16, reference symbol to is the thickness including the transmission board 52 and the transmission sensor chip 53, reference symbol t1 is the thickness of the transmission board 52, and reference symbol t2 is the thickness of the transmission sensor chip 53. The thickness t2 of the transmission sensor chip 53 is smaller than the thickness of the transmission board 52.

As an example, the thickness of the transmission board 52 can be 0.8 to 1.2 mm, and in particular can be 1.0 mm. As an example, the thickness of the transmission sensor chip 53 can be 0.5 to 0.7 mm, and in particular can be 0.578 mm.

As an example, the distance from the board surface 52d of the transmission board 52 to the first enclosing member 65 can be 1.2 to 1.6 mm, in particular can be 1.4 mm.

Note that as is apparent from FIG. 13 and FIG. 14, the receiving board 55 has the same structure as the transmission board 52, and the shape and size of the receiving board 55 are also the same as the transmission board 52.

That is, the receiving board 55 is a rectangular board having short sides E1 and long sides E2, and is provided so that the short side E1 is along the transport direction Fp.

The receiving board 55 is provided with a connector 55c, and a receiving-side cable 77 is connected to the connector 55c.

A second enclosing member 67 is provided on the board surface 55d of the receiving board 55 (see FIG. 22). The second enclosing member 67 is formed of a metal plate material and is fixed to the receiving board 55 by an adhesive.

The second enclosing member 67 is formed with an opening similar to the opening 65a of the first enclosing member 65, the opening is formed so that the sensor central axis Lx of the ultrasonic detection section 50 passes through the vicinity of the center of the opening. The second enclosing member 67 is provided along the board surface 55d.

Note that the thicknesses of the receiving board 55 and the receiving sensor chip 56 are the same as the thicknesses of the above-described transmission board 52 and the transmission sensor chip 53, respectively.

The receiving board fixing screw 57 includes a head section having a driver fitting hole, a screw section having a male screw, and a tip end section of the male screw. The screw section is an attached section, specifically to a screw hole 62g (see FIG. 22), on the same side of the board surface 55d of the receiving board 55 as the receiving sensor chip 56. Note that the screw section may be attached to an attached section, that is, a screw hole, on the side opposite side of the receiving sensor chip 56 with respect to the board surface 55*d* of the receiving board 55.

In a state in which the receiving board 55 is fixed with respect to the receiving board holder 62, the position of the tip end section 57*a* of the receiving board fixing screw 57, is positioned in the +Da direction from the position 67*d* of second enclosing member 67, which is furthest in the −Da direction, in the normal direction Da.

In a state in which the receiving board 55 is fixed to the receiving board holder 62, the position of the tip end section 57*a* of the receiving board fixing screw 57 is in the −Lx direction from the second enclosing member 67 in the axial direction of the sensor central axis Lx.

The distance from the board surface 55*d* of the receiving board 55 to the second enclosing member 67 is shorter than the length of the screw section of the receiving board fixing screw 57.

As an example, the distance from the board surface 55*d* of the receiving board 55 to the second enclosing member 67 can be set to 1.2 to 1.6 mm, in particular can be 1.4 mm.

As described above, since the transmission board 52 is provided with the first enclosing member, which is a member surrounding the transmission sensor chip 53 and which is a plate-shaped member provided along the transmission board 52, and the receiving board 55 is provided with the second enclosing member, which is a member surrounding the receiving sensor chip 56 and which is a plate-shaped member provided along the receiving board 55, it is possible to protect the transmission sensor chip 53 or the receiving sensor chip 56 from an external force.

Configuration of First Protection Member and Second Protection Member

Next, the first protection member 70 and the second protection member 73 will be described in detail.

Note that the first protection member 70 and the second protection member 73 in the present embodiment is the same material, and because the second holding member 74 for holding the second protection member 73 is also the same material as the first holding member 71 for holding the first protection member 70, hereinafter the first protection member 70 and the first holding member 71 will be described and description of the second protection member 73 and the second holding member 74 will be omitted.

Figure 20:
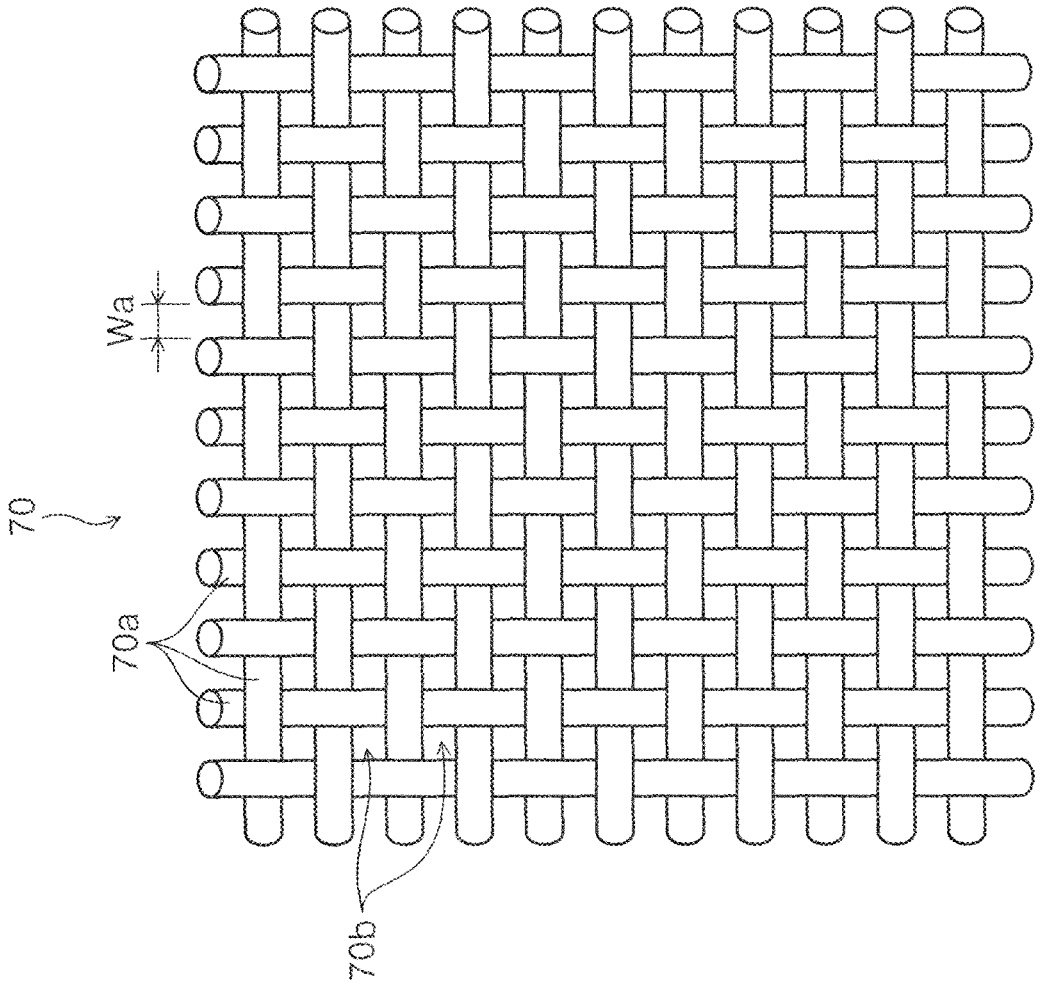
FIG. 20 is an enlarged plan view of the protection member.

The first protection member 70 is a filter configured in a mesh-shape in the present embodiment. FIG. 20 is an enlarged view of a part of the first protection member 70.

In FIG. 20, the first protection member 70 is a filter configured in a mesh-shape by the wires 70*a* being disposed so as to intersect each other. Note that in FIG. 20, an example in which the wires 70*a* intersect at 90°, but this is not a limitation and the wires 70*a* may intersect at an angle other than 90°.

As a material of the wire 70*a*, metal materials such as copper, iron, brass, SUS, or the like, alloy materials, and synthetic resins such as nylon, polyester, or the like can be used. In the present embodiment, polyester is used as an example.

Note that it is desirable the wire diameter of the wire 70*a* is smaller than the wavelength of the ultrasonic waves. By this, the disadvantage that the ultrasonic waves are irregularly reflected by the wire 70*a* of the first protection member 70 is suppressed.

In such the first protection member 70, openings 70*b* are formed between pairs of adjacent wires 70*a*. The openings 70*b* correspond to hole portions through which the ultrasonic waves pass through. In order to suppress adhesion or deposition of foreign matter such as paper dust on the transmission surface 53*a* of the transmission sensor chip 53 or the receiving surface 56*a* of the receiving sensor chip 56, the width of the openings 70*b*, that is, the opening width Wa, is desirably 1 mm or less.

However, in the present embodiment, in order to prevent the cleaning agent from passing through the openings 70*b* when the device is cleaned by the cleaning agent, the opening width Wa is set to 30 μm or less, and is set to 22 μm as an example.

Note that in FIGS. 12 to 14 and FIG. 19, the first protection member 70 or the second protection member 73 is shown in a mesh-shape for easy understanding of the mesh-shaped member, but the intersection angles of the wires 70*a* and the opening width Wa are merely shown for convenience.

As described above, since the first protection member 70 and the second protection member 73 are mesh-shaped members, the ultrasonic waves can pass through the first protection member 70 and the second protection member 73 desirably.

Since the opening width Wa of the mesh-shape member is 30 μm or less, when the device is cleaned by the cleaning agent, it is possible to suppress that the cleaning agent passes through the first protection member 70 and adheres to the transmission sensor chip 53 or that the cleaning agent passes through the second protection member 73 and adheres to the receiving sensor chip 56. As a result, it is possible to suppress a problem in which the strength of the ultrasonic waves received by the receiving sensor chip 56 is reduced and false detections are caused.

As shown in FIG. 19, the above first protection member 70 is held by the first holding member 71, which has an opening 71*b* for exposing the first protection member 70. The first protection member 70 is held by the first holding member 71 by being sandwiched between the two first holding members 71. Double-sided tape (not shown) is used between the first protection member 70 and the first holding member 71, and by this the first protection member 70 and the first holding member 71 are integrated.

Note that the relationship between the second protection member 73 and the second holding member 74 is the same as the relationship between the first protection member 70 and the first holding member 71 described above.

Next, the first protection member 70 is held by the transmission board holder 60 so as to be inclined at an angle α2 with respect to the document surface S as shown in FIG. 22. Similarly, the second protection member 73 is held by the receiving board holder 62 so as to be inclined at the angle α2 with respect to the document surface S. By this, the angle formed by the first protection member 70 and the second protection member 73 becomes 0°, that is, the first protection member 70 and the second protection member 73 become parallel to each other.

In the present embodiment, the angle α2 is set to an angle different from the angle α1, and specifically, the angle α2 is set to be smaller than the angle α1.

That is, when the angle α2 and angle α1 are set to the same angle, that is, when the transmission surface 53*a* and the first protection member 70 are parallel, multiple reflections of the ultrasonic waves will occur between the transmission surface 53*a* and the first protection member 70, and there is a possibility that accurate multi-feed detection will not be possible. The same applies to the case where the receiving surface 56*a* and the second protection member 73 are parallel to each other.

However, since the angle α2 as described above is set to an angle different from the angle α1, it is possible to perform multi-feed detection appropriately by suppressing the multiple reflections described above.

Note that in the present embodiment, as an example, the angle α1 is set to 20° and the angle α2 is set to 15°.

Note that the distance between the transmission surface 53a and the first protection member 70 is also a factor leading to multiple reflections of ultrasonic waves. That is, when the distance between the transmission surface 53a and the first protection member 70 is short, the ultrasonic waves are likely to be reflected multiple times, and in the present embodiment, based on this viewpoint, the distance between the transmission surface 53a and the first protection member 70, that is, the distance along the sensor central axis Lx, is set to 4.0 mm to 6.0 mm, and as an example, to 4.89 mm.

Since the first protection member 70 described above is held by the transmission board holder 60 together with the transmission board 52, it is possible to suppress variation in the distance between the transmission sensor chip 53 and the first protection member 70. As a result, it is possible to appropriately suppress multiple reflections of the ultrasonic waves between the transmission sensor chip 53 and the first protection member 70.

Similarly, since the second protection member 73 is held by the receiving board holder 62 together with the receiving board 55, it is possible to suppress a variation in the distance between the receiving sensor chip 56 and the second protection member 73. As a result, it is possible to appropriately suppress multiple reflections of the ultrasonic waves between the receiving sensor chip 56 and the second protection member 73.

The transmission board holder 60 has the first opening 60f through which the ultrasonic waves pass through on the sensor central axis Lx, and the first protection member 70 is provided so as to cover the first opening 60f on the front surface of the transmission board holder 60.

Similarly, the receiving board holder 62 has the second opening 62f for allowing the ultrasonic waves to pass through on the sensor central axis Lx, and the second protection member 73 is provided so as to cover the second opening 62f on the front surface of the receiving board holder 62.

By this, the following effects can be obtained.

When the foreign matter remains adhering to the first protection member 70 or the second protection member 73, the strength of the ultrasonic waves received by the receiving sensor chip 56 is reduced, which may lead to false detection. Therefore, in this case, it is necessary to replace the first protection member 70 or the second protection member 73 or to perform maintenance such as cleaning.

In the present embodiment, since the first protection member 70 is provided so as to cover the first opening 60f on the surface of the transmission board holder 60, it is easy to replacement and maintenance of the first protection member 70.

Similarly, since the second protection member 73 is provided so as to cover the second opening 62f on the surface of the receiving board holder 62, it is easy to replacement and maintenance of the second protection member 73.

As described with reference to FIG. 22, the transmission sensor chip 53 and the receiving sensor chip 56 are inclined at the angle α1 as the first angle with respect to the surface of the document P passing between the transmission sensor chip 53 and the receiving sensor chip 56.

The first protection member 70 and the second protection member 73 are inclined at an angle α2 as a second angle with respect to the surface of the document P passing between the transmission sensor chip 53 and the receiving sensor chip 56.

The angle α1 and the angle α2 are different from each other, and the angle α2 is smaller than the angle α1.

As a result, the following effects can be obtained.

When the first protection member 70 and the second protection member 73 are parallel to the surface of the document P passing between the transmission sensor chip 53 and the receiving sensor chip 56, the paper dust or the like tends to adhere to the first protection member 70 and the second protection member 73. However, since the first protection member 70 and the second protection member 73 are inclined at the angle α2 with respect to the surface of the document P passing between the transmission sensor chip 53 and the receiving sensor chip 56, it is possible to suppress adhesion of the foreign matters such as paper dust to the first protection member 70 and the second protection member 73.

Note that since the transmission sensor chip 53 and the receiving sensor chip 56 are inclined at the angle α1 with respect to the surface of the document P passing between the transmission sensor chip 53 and the receiving sensor chip 56, it is possible to suppress multiple reflections of the ultrasonic waves between the transmission sensor chip 53 and the document P or between the receiving sensor chip 56 and the document P.

Since the angle α1 and the angle α2 are different from each other, it is possible to suppress multiple reflections of the ultrasonic waves between the transmission sensor chip 53 and the first protection member 70 and to suppress multiple reflections of the ultrasonic waves between the receiving sensor chip 56 and the second protection member 73.

As described with reference to FIG. 5 to FIG. 7, the scanner 1 includes the transmission-side path forming member 36, which is a member forming the reading transport path R2, which is the document transport path between the first roller pair 13 and the second roller pair 16, and which fixes the transmission board holder 60. The transmission-side path forming member 36 is provided with the attachable and detachable cover 37, and when the cover 37 is attached, the transmission board holder 60 is covered by the cover 37, and when the cover 37 is detached, the separation roller 15 is replaceable and also the transmission board holder 60 is exposed. In particular, the first protection member 70 is exposed.

By this, the transmission board holder 60 can be easily accessed. As a result, for example, it is easy to replacement and maintenance of the first protection member 70.

The transmission board holder 60 has the fixing section 60a for fixing the first protection member 70, the transmission board 52 is fixed to the back side of the fixing section 60a, and the fixing section 60 has the first wall section 60b, which is a wall section facing the side of the fixed transmission board 52 and which covers at least a part of the transmission board 52. By this, the foreign matter can be inhibited by the first wall section 60b from passing around to the transmission board 52 from the side of the fixing section 60a.

Relationship Between Configuration of Ultrasonic Detection Section and Other Configurations of Scanner Next, relative positional relationship between the configuration of the ultrasonic detection section 50 and other configurations of the scanner 1 will be described.

Figure 23:
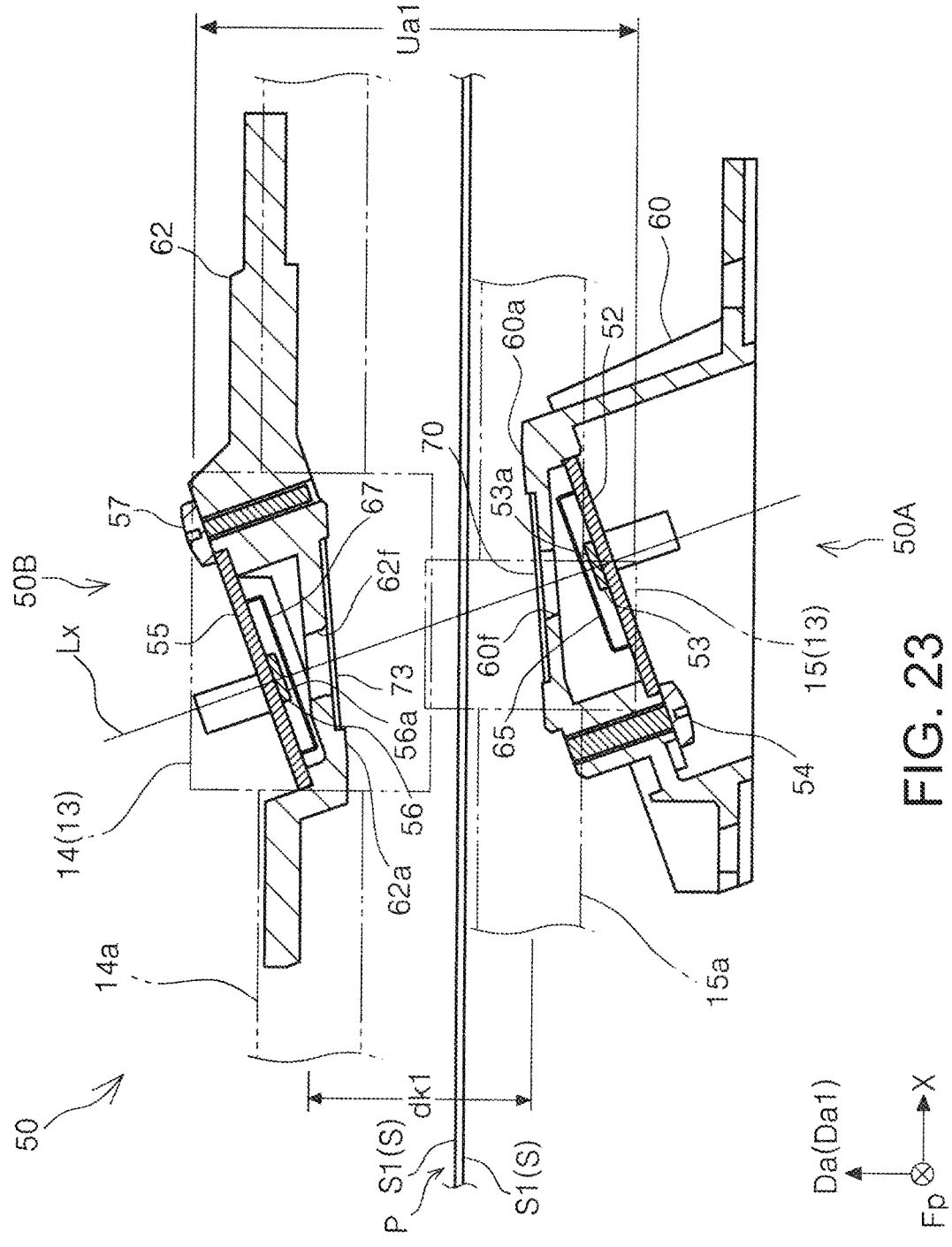
FIG. 23 is a diagram showing a positional relationship between the ultrasonic detection section and the first roller pair.

First, the positional relationship between the ultrasonic detection section 50 and the first roller pair 13 will be described with reference to FIG. 23. FIG. 23 shows the positional relationship between the ultrasonic detection section 50 and the first roller pair 13 as viewed from the upstream side in the transport direction Fp. In FIG. 23, the feed roller 14 and the separation roller 15 constituting the first roller pair 13 are indicated by a two dot chain line.

As shown in the drawing, at least a portion of the transmission sensor chip 53 and at least a portion of the receiving sensor chip 56 are inside the range Ua1 of the first roller pair 13 in the normal direction Da with respect to the document surface S at the nip position of the first roller pair 13. As a result, it is possible to suppress the device size in the normal direction Da.

Note that in the present embodiment, all of the transmission sensor chip 53 and all of the receiving sensor chip 56 are inside the range Ua1 in the normal direction Da, but a part of the transmission sensor chip 53 and a part of the receiving sensor chip 56 may be inside the range Ua1 in the normal direction Da. Alternatively, a part of the transmission sensor chip 53 and the all of the receiving sensor chip 56 may be within the range Ua1 in the normal direction Da. Alternatively, all of the transmission sensor chip 53 and a part of the receiving sensor chip 56 may be inside the range Ua1 in the normal direction Da.

Note that reference symbol 14*a* denotes a rotation axis of the feed roller 14, and the reference symbol 15*a* denotes a rotation axis of the separation roller 15. In the present embodiment, the distance between the axis center of the rotation shaft 14*a* and the axis center of the rotation shaft 15*a*, that is, the inter-axial distance dk1, is 16.6 mm, which is shorter than the distance between the transmission sensor chip 53 and the receiving sensor chip 56, that is, the inter-sensor distance of 24.9 mm. As a result, the area occupied by the first roller pair 13 in the direction along the inter-axial distance dk1 can be reduced, and thus the size of the device can be reduced.

Note that the shaft diameter of the rotation shaft 14*a* in the present embodiment is 6.0 mm, the shaft diameter of the rotation shaft 15*a* is 3.0 to 6.0 mm, 3.9 mm or 5.18 mm as examples, and are greater than 0.578 mm, which is the thickness of both the transmission sensor chip 53 or the receiving sensor chip 56.

Figure 24:
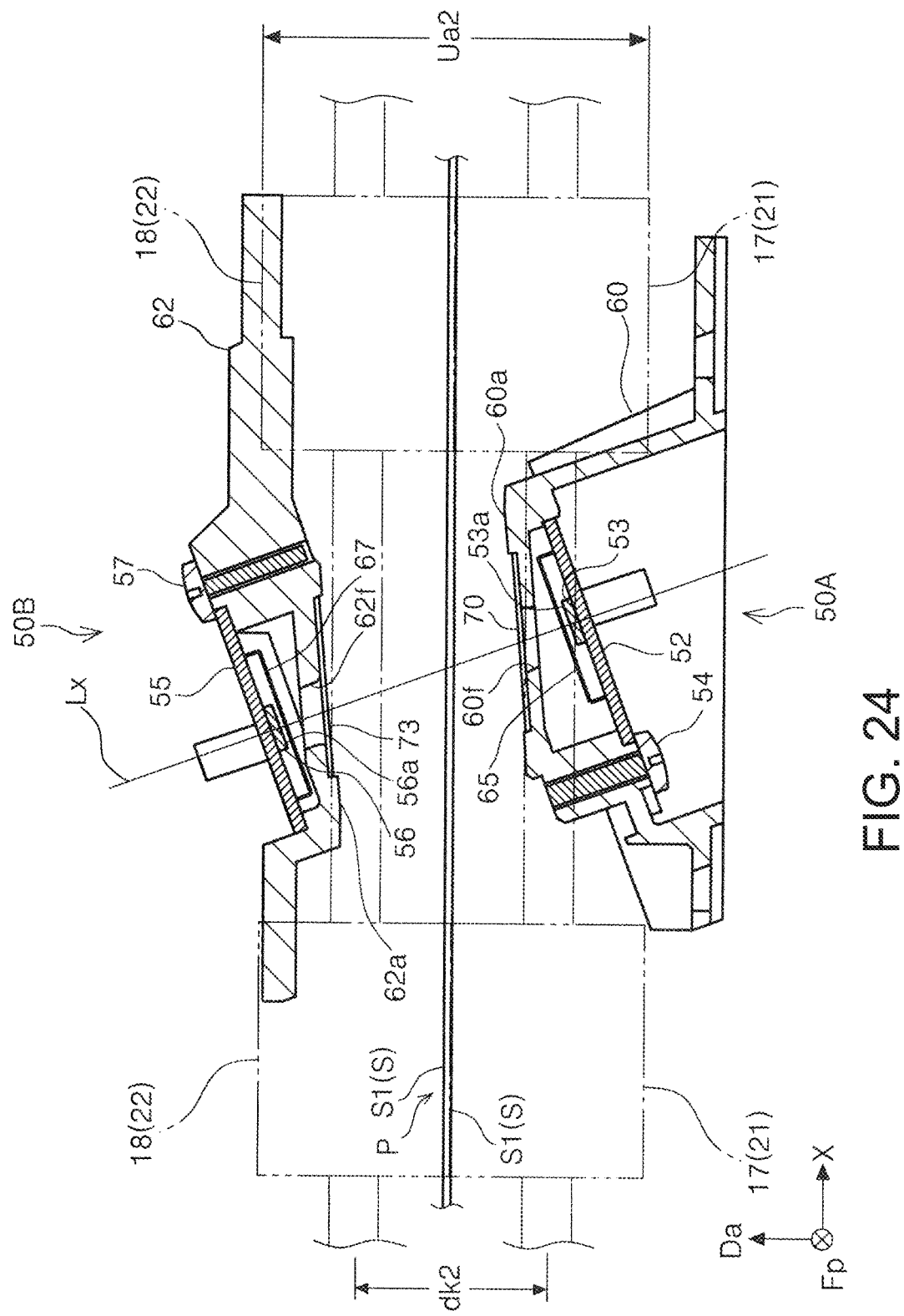
FIG. 24 is a view showing the positional relationship between the ultrasonic detection section and the second roller pair or the third roller pair.

Next, the positional relationship between the ultrasonic detection section 50, the second roller pair 16, and the third roller pair 20 will be described with reference to FIG. 24. FIG. 24 shows the positional relationship between the ultrasonic detection section 50, the second roller pair 16, and the third roller pair 20 as viewed from the upstream side in the transport direction Fp.

In FIG. 24, the second lower roller 17 and the second upper roller 18 constituting the second roller pair 16 are indicated by two dot chain line. Note that a contour of the third lower roller 21 constituting the third roller pair 20 overlaps with the second lower roller 17, and a contour of the third upper roller 22 constituting the third roller pair 20 overlaps with the second upper roller 18.

Note that as will be described in detail later, the second upper roller 18 and the third upper roller 22 are provided so as to move forward and backward with respect to the opposing roller, and FIG. 24 shows a state in which the second upper roller 18 and the third upper roller 22 are both in contact with the opposing roller.

As shown in the drawing, at least a portion of the transmission sensor chip 53 and at least a portion of the receiving sensor chip 56 are inside the range Ua2 of the second roller pair 16 or the third roller pair 20 in the normal direction Da with respect to the document surface S at the nip position of the second roller pair 16 or the third roller pair 20. As a result, it is possible to suppress the size of the device in the normal direction Da with respect to the document surface S at the nip position of the second roller pair 16 or the third roller pair 20.

Note that in the present embodiment, all of the transmission sensor chip 53 and all of the receiving sensor chip 56 are inside the range Ua2 in the normal direction Da, but a part of the transmission sensor chip 53 and a part of the receiving sensor chip 56 may be inside the range Ua2 in the normal direction Da. Alternatively, a part of the transmission sensor chip 53 and all of the receiving sensor chip 56 may be inside the range Ua2 in the normal direction Da. Alternatively, all of the transmission sensor chip 53 and a part of the receiving sensor chip 56 may be inside the range Ua2 in the normal direction Da.

Note that the relationship between the dimensions of the rotation shaft of the second lower roller 17, the second upper roller 18, the third lower roller 21, and the third upper roller 22 and the dimensions of the transmission sensor chip 53 and the receiving sensor chip 56 will be described later.

Note that in the present embodiment, a part of the transmission board 52 and the all of receiving board 55 are inside the range Ua1 in the normal direction Da. However, all of the transmission board 52 and all of the receiving board 55 may be inside the range Ua1 in the normal direction Da. Alternatively, a part of the transmission board 52 and a part of the receiving board 55 may be inside the range Ua1 in the normal direction Da. Alternatively, all of the transmission board 52 and a part of the receiving board 55 may be inside the range Ua1 in the normal direction Da.

Note that the distance between the center of the rotation axis of the second lower roller 17 and the center of the rotation axis of the second upper roller 18, or the distance between the center of the rotation axis of the third lower roller 21 and the center of the rotation axis of the third upper roller 22, that is, inter-axial distance dk2, is 15.4 mm, which is shorter than the distance between the transmission sensor chip 53 and the receiving sensor chip 56, that is, the inter-sensor distance of 24.9 mm.

As a result, it is possible to suppress the area occupied by the second roller pair 16 or the third roller pair 20 in the direction along the inter-axial distance dk2, and thus it is possible to suppress the size of the device.

Next, the transmission board 52 and the receiving board 55 are inclined with respect to the normal direction Da with respect to the document surface S passing between the transmission sensor chip 53 and the receiving sensor chip 56, the transmission surface 53*a* of the transmission sensor chip 53 is along the surface of the transmission board 52, and the receiving surface 56*a* of the receiving sensor chip 56 is along the surface of the receiving board 55.

At least a part of the transmission board 52 and at least a part of the receiving board 55 are inside the range of the second roller pair 16 or the third roller pair 20 in the normal direction Da with respect to the document surface S at the nip position of the second roller pair 16 or the third roller pair 20. As a result, it is possible to suppress the device size in the normal direction Da.

Note that in the present embodiment, all of the transmission board 52 and a part of the receiving board 55 are inside the range Ua2 in the normal direction Da, but a part of the transmission board 52 and a part of the receiving board 55 may be inside the range Ua2 in the normal direction Da. Alternatively, a part of the transmission board 52 and all of the receiving board 55 may be inside the range Ua2 in the normal direction Da. Alternatively, all of the transmission board 52 and all of the receiving board 55 may be inside the range Ua2 in the normal direction Da.

In the present embodiment, all of the transmission sensor chip 53 and all of the receiving sensor chip 56 are inside the range Ua2 in the normal direction Da. However, a part of the transmission sensor chip 53 and a part of the receiving sensor chip 56 may be inside the range Ua2 in the normal direction Da. Alternatively, a part of the transmission sensor chip 53 and all of the receiving sensor chip 56 may be inside the range Ua2 in the normal direction Da. Alternatively, all of the transmission sensor chip 53 and a part of the receiving sensor chip 56 may be inside the range Ua2 in the normal direction Da.

Next, the configuration of the second roller pair 16 will be further described with reference to FIG. 25.

In the present embodiment, two second roller pairs 16 are provided along the X-axis direction, that is, the document width direction, and the two second roller pairs 16 are provided at positions symmetrical with respect to the center position CL of the document P in the document width direction.

Reference symbol 17a denotes a rotation shaft of the second lower roller 17.

Reference symbol 18a1 denotes a rotation shaft positioned between the two second upper rollers 18, reference symbol 18a2 denotes a rotation shaft positioned on both sides of the two second upper rollers 18, and the shaft diameter of the rotation shaft 18a1 is smaller than the shaft diameter of the rotation shaft 18a2.

The rotation shaft 18a2 positioned in the +X direction is connected to a first universal joint 31A. A second universal joint 31B is further provided in the +X direction with respect to the first universal joint 31A, and the first universal joint 31A and the second universal joint 31B are connected by a rotation shaft 18a3.

Since the second upper roller 18 moves forward and backward with respect to the second lower roller 17 and power is transmitted thereto, the second upper roller 18 can be driven while moving forward and backward with respect to the second lower roller 17 by the first universal joint 31A and the second universal joint 31B.

Figure 25:
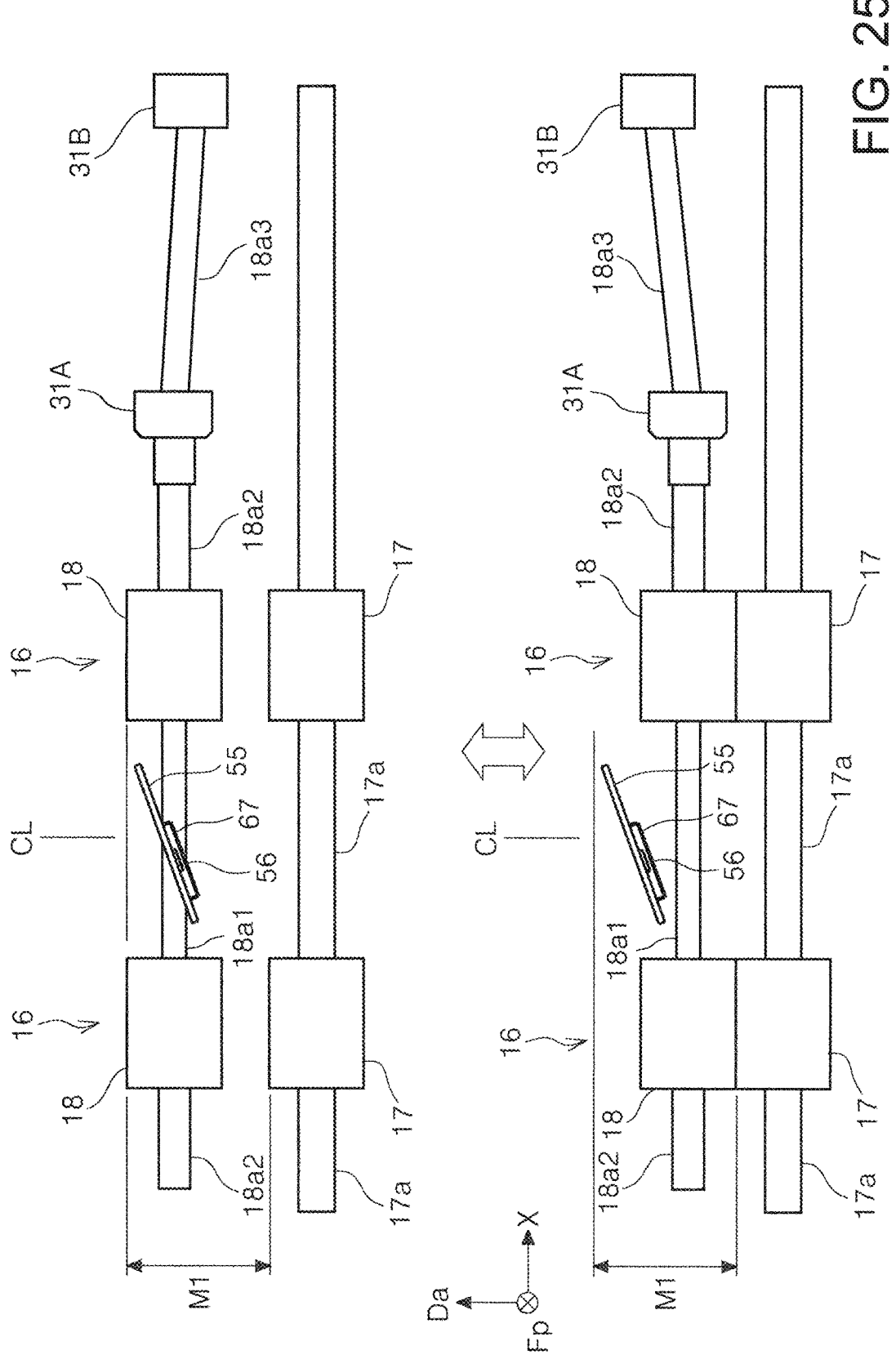
FIG. 25 is a view showing a configuration of the second roller pair.

In FIG. 25, the lower figure shows a state in which the second upper roller 18 is in contact with the second lower roller 17, and in FIG. 25, the upper figure shows a state in which the second upper roller 18 is maximally separated from the second lower roller 17. Reference symbol M1 indicates a range in which the second upper roller 18 moves.

In the present embodiment as shown, because all of the receiving sensor chip 56 and all of the receiving board 55 are the inside of the range M1 in the normal direction Da, it is possible to suppress the device dimensions in the normal direction Da.

Note that in the present embodiment, all of the receiving sensor chip 56 and all of the receiving board 55 are inside the range M1 in the normal direction Da, but a part of the receiving sensor chip 56 and a part of the receiving board 55 may be inside the range M1 in the normal direction Da. Alternatively, all of the receiving sensor chip 56 and a part of the receiving board 55 may be inside the range M1 in the normal direction Da.

Note that the relationship between the third roller pair 20, the receiving sensor chip 56, and the receiving board 55 is also the same as the relationship between the second roller pair 16 and the receiving sensor chip 56 and the receiving board 55, described above.

Note that in the present embodiment, the shaft diameter of the rotation shaft 17a is 6.0 mm. The shaft diameter of the rotation shaft 18a1 is 4.0 mm, the shaft diameter of the rotation shaft 18a2 is 5.0 mm, and the shaft diameter of the rotation shaft 18a3 is 4.5 mm, all of which are larger than the thickness of the transmission sensor chip 53 or the receiving sensor chip 56.

Note that as described above, the path length between the first roller pair 13 and the second roller pair 16, that is, the path length of the downstream feeding path R1 is shorter than the path length between the second roller pair 16 and the third roller pair 20, that is, the path length of the reading transport path R2. As a result, it is possible to suppress the path length between the first roller pair 13 and the second roller pair 16, and thus it is possible to suppress the size of the device.

In the present embodiment, the transmission board 52 and the receiving board 55 have the long side E2 and the short side E1 as described with reference to FIG. 13 to FIG. 15, and are disposed so that the short side E1 is along the transport direction Fp. As a result, the first roller pair 13 and the second roller pair 16 can be brought close to each other in the transport direction Fp, which can contribute to downsizing of the device.

The lengths of the short side E1 of the transmission board 52 and the receiving board 55 are shorter than the lengths of a glass plate 32e in the transport direction Fp.

Figure 26:
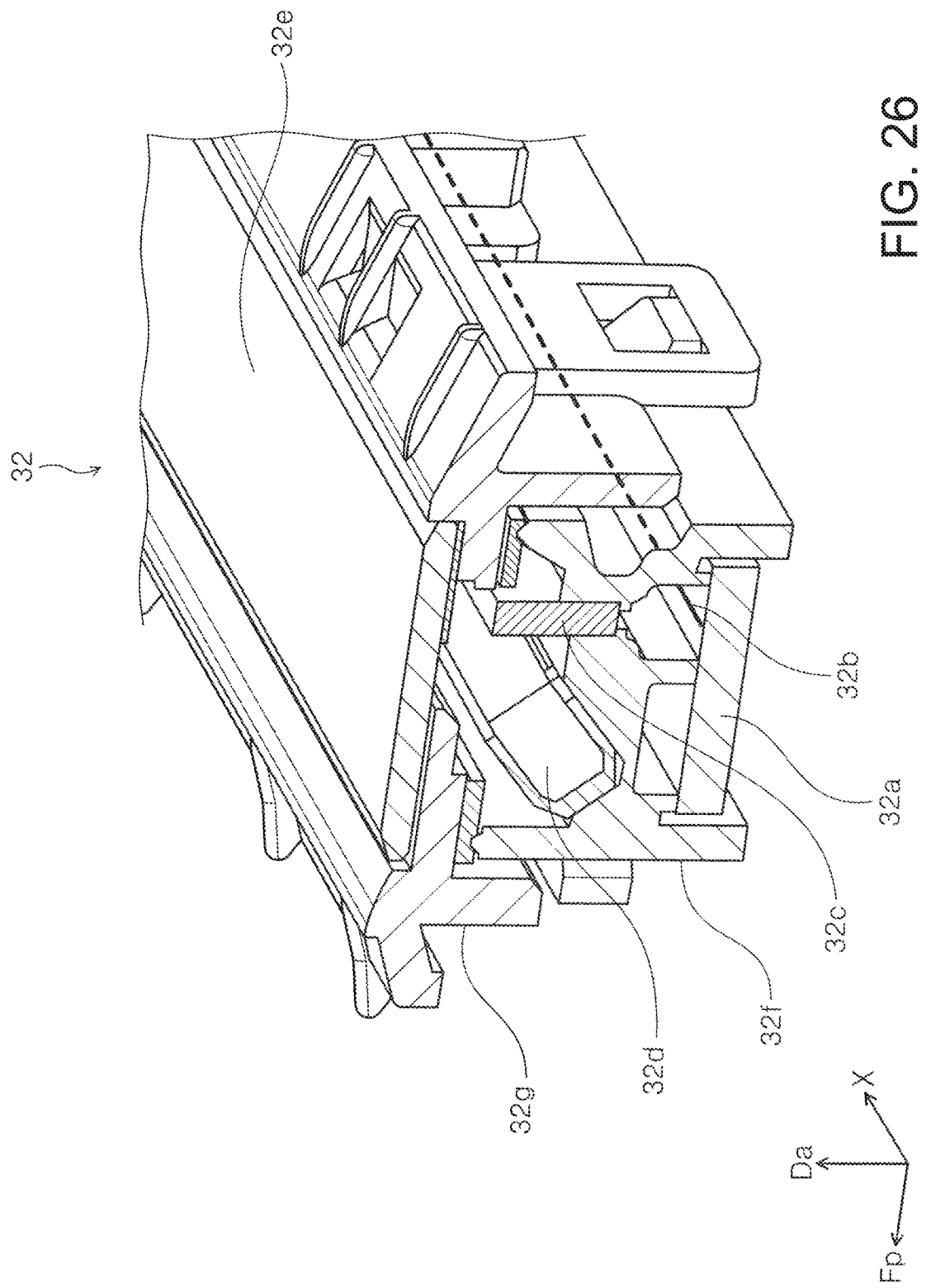
FIG. 26 is a cross-sectional perspective view showing a structure of a first reading section.

Here, the configuration of the first reading section 32 and the second reading section 33 will be described with reference to FIG. 26. Note that the configurations of the first reading section 32 and the second reading section 33 are basically the same, and the configuration of the first reading section 32 will be described below.

The first reading section 32 includes a lower housing 32f and the upper housing 32g, and the lower housing 32f has a sensor board 32a. The sensor board 32a is provided with a line-shaped image sensor 32b, which is an example of a reading sensor, and the image sensor 32b receives light reflected from the document P via a lens 32c. Note that reference symbol 32d denotes a light source that irradiates the document P.

The upper housing 32g is provided with the glass plate 32e. The glass plate 32e has a function of transmitting light reflected by the document P to the lens 32c, and also has a function of guiding the document P downstream by in contact with the document P.

As described above, the length of the short side E1 of the transmission board 52 and the receiving board 55 is shorter than the length of the glass plate 32e in the transport direction Fp. Note that in the present embodiment, in the transmission board 52 and the receiving board 55, the length of the short side E1 is 8.6 mm, the length of the long side E2 is 26.8 mm, and the length of the glass plate 32e in the transport direction Fp is 12.6 mm.

Thus, it is possible to suppress the length of the short side E1 of the transmission board 52 and the receiving board 55 in the transport direction Fp. As a result, the first roller pair 13 and the second roller pair 16 can be brought closer to each other in the transport direction Fp, and it is possible to contribute to further downsizing of the device.

Note that in the present embodiment, the glass plate 32e is 1.1 mm thick, which is larger than 0.578 mm thick of the transmission sensor chip 53 or the receiving sensor chip 56.

Figure 27:
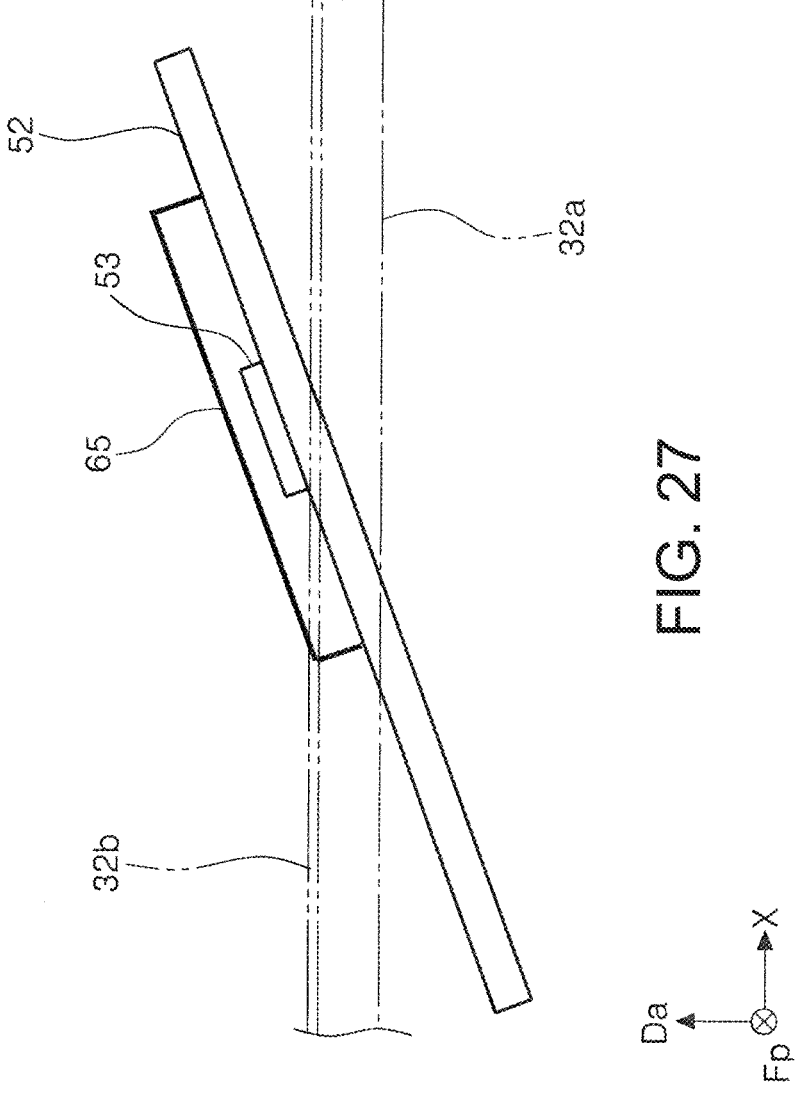
FIG. 27 is a diagram showing the positional relationship between a sensor board of a first reading unit, the transmission sensor chip, and the transmission board.

Next, FIG. 27 shows the positional relationship between the transmission board 52 and the transmission sensor chip 53, and the sensor board 32a and the image sensor 32b, when the transmission board 52 and the transmission sensor chip 53 are viewed from the upstream side in the transport direction Fp. The sensor board 32a and the image sensor 32b in FIG. 27 are shown by two dot chain line.

As shown in the drawing, the transmission sensor chip 53 is positioned on the +Da side from the image sensor 32b, that is, on the second reading section 33 side in the normal direction Da. Accordingly, it is possible to suppress the amount of protrusion of the transmission sensor chip 53 from the first reading section 32 to the –Da side, that is, the lower side in the normal direction Da, and to suppress the size of the device in the normal direction Da.

Figure 28:
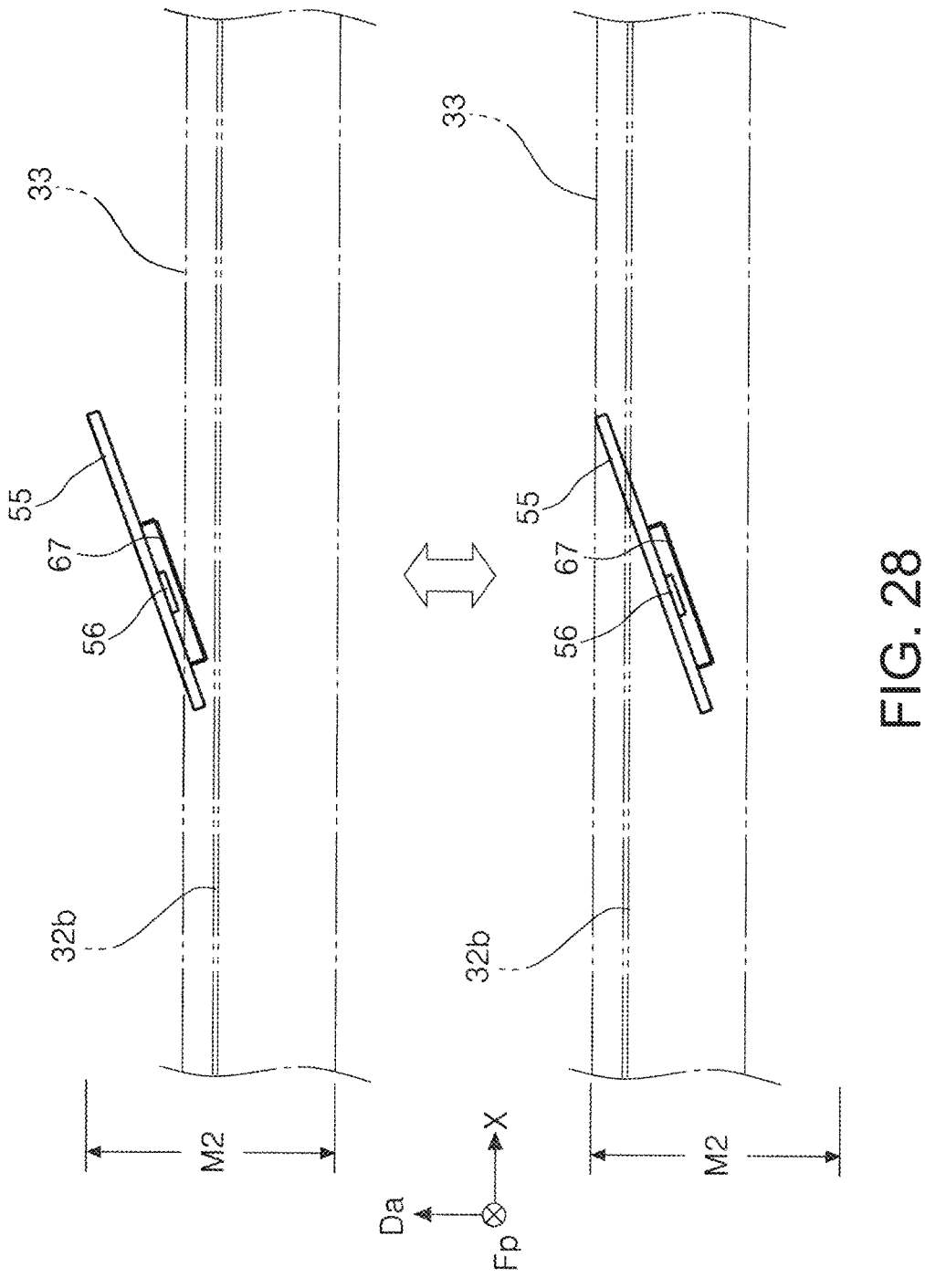
FIG. 28 is diagrams showing the positional relationship between a second reading unit, a receiving sensor chip, and the receiving board.

Next, FIG. 28 shows the positional relationship between the receiving board 55 and the receiving sensor chip 56, and the second reading section 33 when the receiving board 55 and the receiving sensor chip 56 are viewed from the upstream side in the transport direction Fp. In FIG. 28, the outer shape of the second reading section 33 and the image sensor 32b included in the second reading section 33 are indicated by two dot chain line.

The second reading section 33 moves forward and backward with respect to the first reading section 32, the lower figure in FIG. 28 shows a state most separated from the first reading section 32, and the upper figure in FIG. 28 shows a state maximally advanced toward the first reading section 32. A range indicated by reference symbol M2 indicates a region in which the second reading section 33 is displaced.

As shown, at least a part of the receiving sensor chip 56 is inside the range M2 in the normal direction Da. By this, it is possible to suppress the device size in the normal direction Da.

Similarly, at least a part of the receiving board 55 is inside the range M2 in the normal direction Da. By this, it is possible to suppress the device size in the normal direction Da.

Note that in the present embodiment, all of the receiving sensor chip 56 and all of the receiving board 55 are inside the range M2 in the normal direction Da. However, a part of the receiving sensor chip 56 and a part of the receiving board 55 may be inside the range M2 in the normal direction Da. Alternatively, all of the receiving sensor chip 56 and a part of the receiving board 55 may be inside the range M2 in the normal direction Da.

Figure 29:
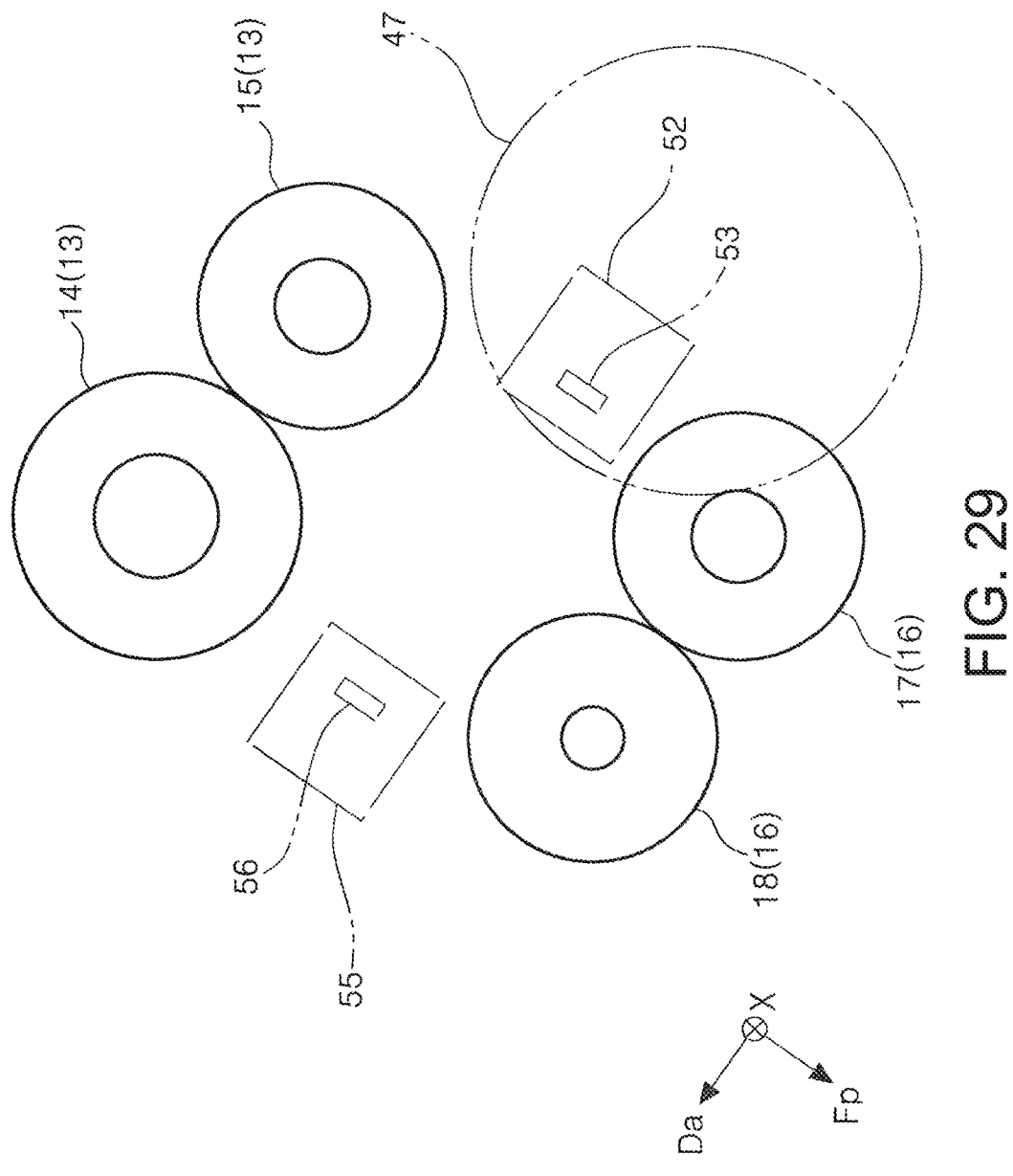
FIG. 29 is a diagram showing these occupied areas of the first roller pair, the second roller pair, a transport motor, the transmission sensor chip, the transmission board, the receiving sensor chip, and the receiving board.

Next, FIG. 29 shows an occupied region of the first roller pair 13, the second roller pair 16, the transport motor 47, the transmission sensor chip 53, the transmission board 52, the receiving sensor chip 56, and the receiving board 55 as viewed from the X-axis direction.

As shown, at least a part of the transmission board 52 and at least a part of the transmission sensor chip 53 are in the occupied region of the transport motor 47. By this, it is possible to suppress to enlargement of the device.

Note that in the present embodiment, a part of the transmission board 52 and all of the transmission sensor chip 53 are inside the occupied region of the transport motor 47, but all of the transmission board 52 and all of the transmission sensor chip 53 may be inside the occupied region of the transport motor 47, or a part of the transmission board 52 and a part of the transmission sensor chip 53 may be inside the occupied region of the transport motor 47.

It is needless to say that the present disclosure is not limited to the embodiments described above, and various modifications can be made within the scope of the disclosure described in the claims, and these are also included within the scope of the present disclosure.

For example, in the above described embodiment, the medium transport device 100 is applied to the scanner 1, which is an example of an image reading device, but the disclosure is not limited thereto, and the medium transport device 100 may be applied to a recording device, which performs recording on a medium, or a post-processing device, which performs post-processing such as stapling processing or punching processing on a medium.

What is claimed is:

1. A medium transport device comprising:
a first roller pair configured to transport a medium in a transport direction;
a second roller pair disposed downstream of the first roller pair in the transport direction; and
an ultrasonic detection section disposed between the first roller pair and the second roller pair in the transport direction, wherein the ultrasonic detection section includes
a transmission sensor chip configured to emit ultrasonic waves along a first axis toward a first surface of the medium being transported,
a receiving sensor chip that is configured to receive the ultrasonic waves and that is disposed at a position sandwiching the medium with the transmission sensor chip, the position being on the first axis,
a transmission board that is a transmission board on which the transmission sensor chip is provided and on which the transmission sensor chip is mounted on a board surface, and
a receiving board that is a receiving board on which the receiving sensor chip is provided and on which the receiving sensor chip is mounted on a board surface, wherein
the first axis is inclined with respect to a surface of the medium passing between the transmission sensor chip and the receiving sensor chip,
the thickness of the transmission sensor chip is smaller than the thickness of the transmission board,
the thickness of the receiving sensor chip is smaller than a thickness of the receiving board,
at least a part of the transmission sensor chip and at least a part of the receiving sensor chip are within a range of the second roller pair in a normal direction with respect to the surface of the medium at a nip position of the second roller pair, and
an inter-axial distance of two rollers constituting the second roller pair is shorter than a distance between the transmission sensor chip and the receiving sensor chip on the first axis.

2. The medium transport device according to claim 1, wherein at least a part of the transmission sensor chip and at least a part of the receiving sensor chip are within a range of the first roller pair in a normal direction with respect to the surface of the medium at a nip position of the first roller pair.

3. The medium transport device according to claim 1, further comprising:
a third roller pair disposed downstream of the second roller pair in the transport direction,
wherein at least a part of the transmission sensor chip and at least a part of the receiving sensor chip are within a range of the third roller pair a normal direction with respect to the surface of the medium at a nip position of the third roller pair.

4. The medium transport device according to claim 1, further comprising:
a third roller pair disposed downstream of the second roller pair in the transport direction,
wherein an inter-axial distance of two rollers constituting the third roller pair is shorter than a distance between the transmission sensor chip and the receiving sensor chip on the first axis.

5. The medium transport device according to claim 1, wherein an inter-axial distance of two rollers constituting the first roller pair is shorter than a distance between the transmission sensor chip and the receiving sensor chip on the first axis.

6. The medium transport device according to claim 1, wherein the transmission board and the receiving board are inclined with respect to a normal direction with respect to the surface of the medium passing between the transmission sensor chip and the receiving sensor chip, a transmission surface of the transmission sensor chip is along a surface of the transmission board, a receiving surface of the receiving sensor chip is along a surface of the receiving board, and at least a part of the transmission board and at least a part of the receiving board are within the range of the second roller pair in the normal direction with respect to the surface of the medium at the nip position of the second roller pair.

7. The medium transport device according to claim 1, further comprising:

a third roller pair disposed downstream of the second roller pair in the transport direction, wherein a path length between the first roller pair and the second roller pair is shorter than a path length between the second roller pair and the third roller pair.

8. The medium transport device according to claim 1, further comprising:

a transmission board holder configured to hold the transmission board, a receiving board holder configured to hold the receiving board, a transmission-side path forming member that is configured to form a medium transport path between the first roller pair and the second roller pair and that fixes the transmission board holder, and a receiving-side path forming member that is configured to form the medium transport path between the first roller pair and the second roller pair and that fixes the receiving board holder.

9. The medium transport device according to claim 8, wherein the transmission board holder includes a first protection member that is provided on the first axis and that is positioned between the transmission sensor chip and the medium and the receiving board holder includes a second protection member that is provided on the first axis and that is positioned between the receiving sensor chip and the medium.

10. An image reading device comprising:

the medium transport device according to claim 1 and a reading section that is positioned downstream of the second roller pair in the transport direction and that is configured to read an image on the medium.

11. The image reading device according to claim 10, wherein the transmission board and the receiving board have a long side and a short side, and are disposed such that the short side is along the transport direction, the reading section includes a glass plate configured to contact the medium and guide the medium downstream, and the length of the short side of the transmission board and the length of the short side of the receiving board are both shorter than the length of the glass plate in the transport direction.

12. The image reading device according to claim 10, wherein the reading section is a first reading section configured to read the first surface of the medium, and the image reading device further includes a second reading section configured to read a second surface opposite to the first surface, the first reading section includes a reading sensor, and the transmission sensor chip is positioned closer to the second reading section than the reading sensor in the normal direction with respect to the surface of the medium facing the first reading section.

13. The image reading device according to claim 10, wherein the reading section is a first reading section configured to read the first surface of the medium, and the image reading device further includes a second reading section configured to read a second surface of the medium and at least a part of the receiving sensor chip is within a range of the second reading section in the normal direction with respect to the surface of the medium facing the second reading section.

14. A medium transport device comprising:

a first roller pair configured to transport a medium in a transport direction;

a second roller pair disposed downstream of the first roller pair in the transport direction;

a third roller pair disposed downstream of the second roller pair in the transport direction; and an ultrasonic detection section disposed between the first roller pair and the second roller pair in the transport direction, wherein the ultrasonic detection section includes a transmission sensor chip configured to emit ultrasonic waves along a first axis toward a first surface of the medium being transported, a receiving sensor chip that is configured to receive the ultrasonic waves and that is disposed at a position sandwiching the medium with the transmission sensor chip, the position being on the first axis, a transmission board that is a transmission board on which the transmission sensor chip is provided and on which the transmission sensor chip is mounted on a board surface, and a receiving board that is a receiving board on which the receiving sensor chip is provided and on which the receiving sensor chip is mounted on a board surface, wherein the first axis is inclined with respect to a surface of the medium passing between the transmission sensor chip and the receiving sensor chip, the thickness of the transmission sensor chip is smaller than the thickness of the transmission board, the thickness of the receiving sensor chip is smaller than a thickness of the receiving board, at least a part of the transmission sensor chip and at least a part of the receiving sensor chip are within a range of the second roller pair in a normal direction with respect to the surface of the medium at a nip position of the second roller pair, and an inter-axial distance of two rollers constituting the third roller pair is shorter than a distance between the transmission sensor chip and the receiving sensor chip on the first axis.

15. The medium transport device according to claim 14, wherein at least a part of the transmission sensor chip and at least a part of the receiving sensor chip are within a range of the first roller pair in a normal direction with respect to the surface of the medium at a nip position of the first roller pair.

16. An image reading device comprising:

the medium transport device according to claim 14 and a reading section that is positioned downstream of the second roller pair in the transport direction and that is configured to read an image on the medium.

17. A medium transport device comprising:

a first roller pair configured to transport a medium in a transport direction;

a second roller pair disposed downstream of the first roller pair in the transport direction; and an ultrasonic detection section disposed between the first roller pair and the second roller pair in the transport direction, wherein the ultrasonic detection section includes a transmission sensor chip configured to emit ultrasonic waves along a first axis toward a first surface of the medium being transported, a receiving sensor chip that is configured to receive the ultrasonic waves and that is disposed at a position sandwiching the medium with the transmission sensor chip, the position being on the first axis, a transmission board that is a transmission board on which the transmission sensor chip is provided and on which the transmission sensor chip is mounted on a board surface, and a receiving board that is a receiving board on which the receiving sensor chip is provided and on which the receiving sensor chip is mounted on a board surface, wherein the first axis is inclined with respect to a surface of the medium passing between the transmission sensor chip and the receiving sensor chip, the thickness of the transmission sensor chip is smaller than the thickness of the transmission board, the thickness of the receiving sensor chip is smaller than a thickness of the receiving board, at least a part of the transmission sensor chip and at least a part of the receiving sensor chip are within a range of the second roller pair in a normal direction with respect to the surface of the medium at a nip position of the second roller pair, and an inter-axial distance of two rollers constituting the first roller pair is shorter than a distance between the transmission sensor chip and the receiving sensor chip on the first axis.

18. An image reading device comprising:

the medium transport device according to claim 17 and a reading section that is positioned downstream of the second roller pair in the transport direction and that is configured to read an image on the medium.

19. A medium transport device comprising:

a first roller pair configured to transport a medium in a transport direction;

a second roller pair disposed downstream of the first roller pair in the transport direction; and an ultrasonic detection section disposed between the first roller pair and the second roller pair in the transport direction, wherein the ultrasonic detection section includes a transmission sensor chip configured to emit ultrasonic waves along a first axis toward a first surface of the medium being transported, a receiving sensor chip that is configured to receive the ultrasonic waves and that is disposed at a position sandwiching the medium with the transmission sensor chip, the position being on the first axis, a transmission board that is a transmission board on which the transmission sensor chip is provided and on which the transmission sensor chip is mounted on a board surface, and a receiving board that is a receiving board on which the receiving sensor chip is provided and on which the receiving sensor chip is mounted on a board surface, wherein the first axis is inclined with respect to a surface of the medium passing between the transmission sensor chip and the receiving sensor chip, the thickness of the transmission sensor chip is smaller than the thickness of the transmission board, the thickness of the receiving sensor chip is smaller than a thickness of the receiving board, at least a part of the transmission sensor chip and at least a part of the receiving sensor chip are within a range of the second roller pair in a normal direction with respect to the surface of the medium at a nip position of the second roller pair, the transmission board and the receiving board are inclined with respect to a normal direction with respect to the surface of the medium passing between the transmission sensor chip and the receiving sensor chip, a transmission surface of the transmission sensor chip is along a surface of the transmission board, a receiving surface of the receiving sensor chip is along a surface of the receiving board, and at least a part of the transmission board and at least a part of the receiving board are within the range of the second roller pair in the normal direction with respect to the surface of the medium at the nip position of the second roller pair.

20. An image reading device comprising:

the medium transport device according to claim 19 and a reading section that is positioned downstream of the second roller pair in the transport direction and that is configured to read an image on the medium.

\* \* \* \* \*